(12) United States Patent
Irvin et al.

(10) Patent No.: US 12,416,567 B2
(45) Date of Patent: Sep. 16, 2025

(54) FLOW CELLS WITH PATTERNED BONDING REGIONS

(71) Applicant: ILLUMINA, INC., San Diego, CA (US)

(72) Inventors: Casey Scott Irvin, San Marcos, CA (US); Jonathan Ziebarth, Solana Beach, CA (US); Michael Rapp, La Jolla, CA (US); Danny Yuan Chan, San Diego, CA (US); Innsu Daniel Kim, San Diego, CA (US); Avishek Aiyar, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 207 days.

(21) Appl. No.: 18/455,467

(22) Filed: Aug. 24, 2023

(65) Prior Publication Data
US 2024/0102913 A1    Mar. 28, 2024

Related U.S. Application Data

(60) Provisional application No. 63/373,617, filed on Aug. 26, 2022.

(51) Int. Cl.
*G01N 15/1434*    (2024.01)

(52) U.S. Cl.
CPC .................. *G01N 15/1436* (2013.01)

(58) Field of Classification Search
CPC ........ G01N 15/1436; B01J 2219/00608; B01J 2219/0061; B01J 2219/00612; B01J 2219/00621; B01J 2219/00626; B01J 2219/00637; B01J 2219/00722; B01J 19/0046

USPC ........................................................ 356/246
See application file for complete search history.

(56) References Cited

U.S. PATENT DOCUMENTS

| 6,503,359 | B2 | 1/2003 | Mrtanen | |
| 2003/0059764 | A1* | 3/2003 | Ravkin | B01J 19/0046 435/7.21 |
| 2013/0338042 | A1* | 12/2013 | Shen | C12Q 1/6874 506/26 |
| 2021/0170400 | A1 | 6/2021 | Han et al. | |

FOREIGN PATENT DOCUMENTS

| WO | 2018208561 A1 | 11/2018 |
| WO | 2022101401 A1 | 5/2022 |
| WO | 2022132769 A2 | 6/2022 |

* cited by examiner

*Primary Examiner* — Md M Rahman
(74) *Attorney, Agent, or Firm* — Dierker & Kavanaugh, P.C.

(57) ABSTRACT

An example flow cell includes a patterned substrate having an active region and a bonding region that at least partially surrounds the active region. The active region includes first depressions defined in a layer of the patterned substrate, surface chemistry positioned in the first depressions, and first interstitial regions surrounding the first depressions. The bonding region includes second depressions defined in the layer and second interstitial regions surrounding the second depressions. An adhesive is positioned over the second depressions and over the second interstitial regions. A cover is attached to the adhesive such that a flow channel is defined between a portion of the cover and the active region.

25 Claims, 13 Drawing Sheets
Specification includes a Sequence Listing.

FLOW CELLS WITH PATTERNED BONDING REGIONS

CROSS-REFERENCE TO RELATED APPLICATION

This application claims the benefit of U.S. Provisional Application Ser. No. 63/373,617, filed Aug. 26, 2022, the contents of which is incorporated by reference herein in its entirety.

REFERENCE TO SEQUENCE LISTING

The instant application contains a Sequence Listing which has been submitted electronically in XML format and is hereby incorporated by reference in its entirety. Said XML copy, created on Aug. 15, 2023, is named ILI242B_IP-2339-US_SL.xml, and is 15,791 bytes in size.

BACKGROUND

Flow cells are used in a variety of methods and applications, such as gene sequencing, genotyping, etc. For nucleic acid analysis, the surface of the flow cell may be functionalized with specific surface chemistry, such as primers, polymerases, etc. depending upon the reaction that is to take place. The designated reactions may then be observed or detected and subsequent analysis may help identify or reveal properties of chemicals involved in the reaction. In some examples, the controlled reactions alter charge, conductivity, or some other electrical property, and thus an electronic system may be used for detection. In other examples, the controlled reactions generate fluorescence, and thus an optical system may be used for detection.

SUMMARY

Flow cells are disclosed herein that include at least one patterned substrate. The patterned substrate includes an active region and a bonding region. The bonding region of the patterned substrate may be bonded to a lid, a second patterned substrate, or a second partially patterned substrate that includes the bonding region but no active region. In the examples disclosed herein, the bonding region is patterned with features, including depressions or posts separated by interstitial regions. These features introduce an additional axis for an adhesive to bond to, and also increase the surface area of the substrate that is available for bonding. As such, the overall compressive and shear holding power at the bonding region is increased. The bonding region in the examples disclosed herein can improve the bond integrity of the flow cell and help to prevent fluid leaking during use.

BRIEF DESCRIPTION OF THE FIGURES

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

Figure 3A:
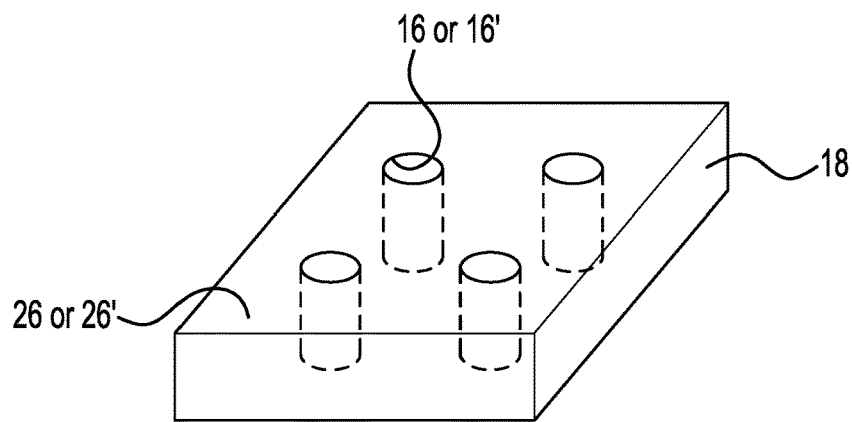
Figure 3B:
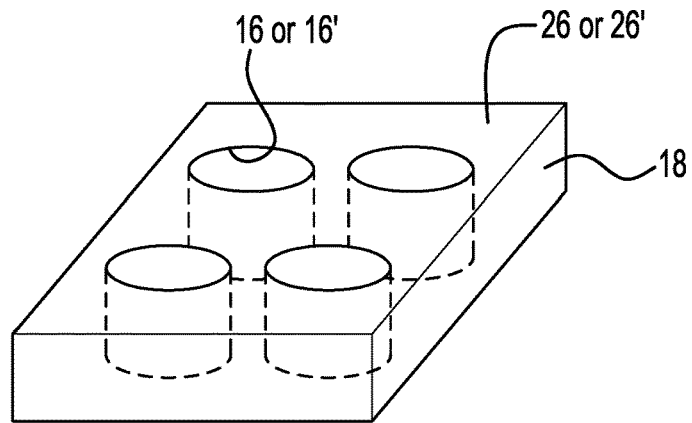
Figure 4A:
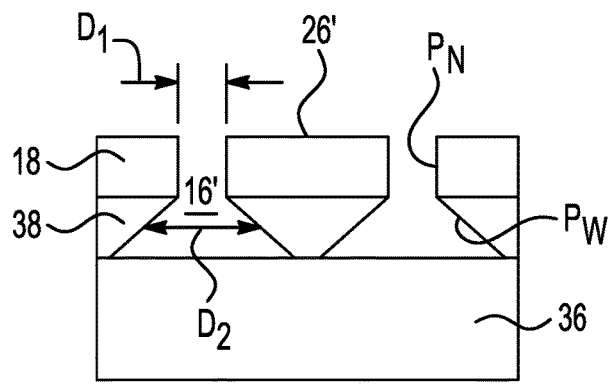
Figure 4B:
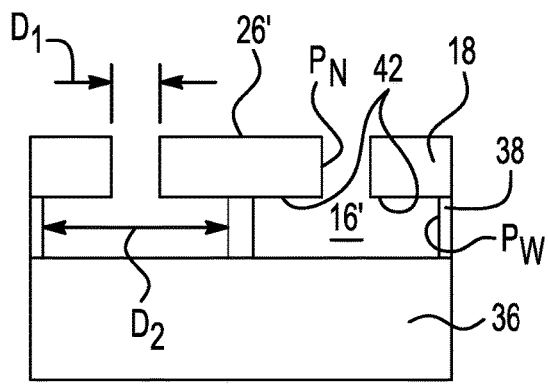
Figure 4C:
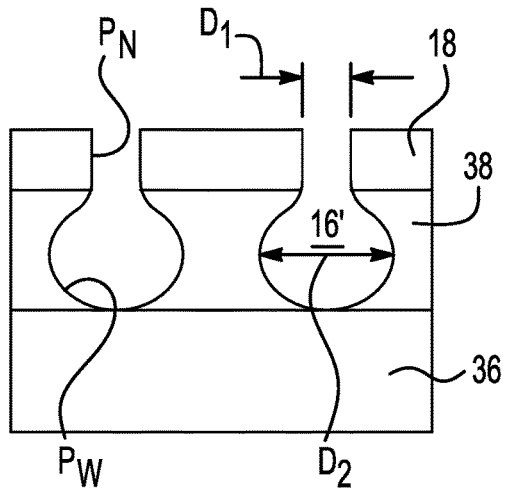
Figure 5:
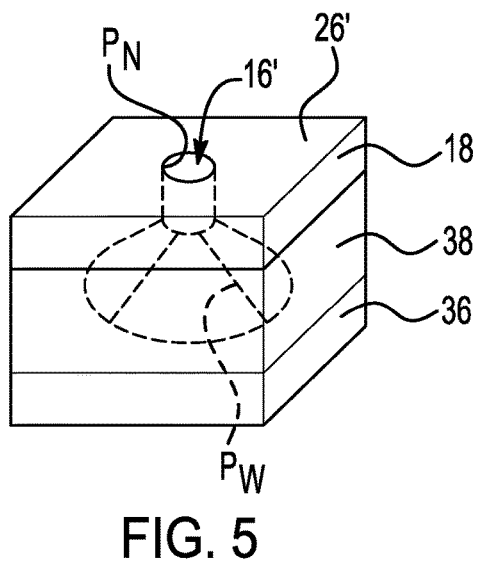
Figure 6:
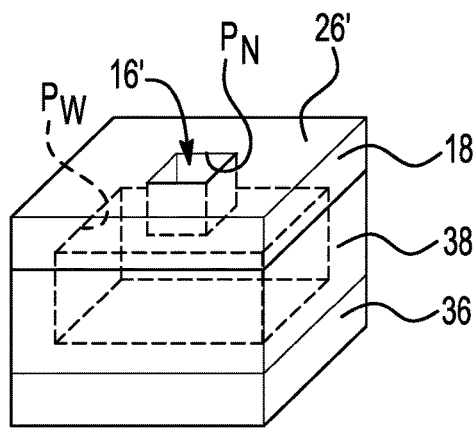
Figure 7:
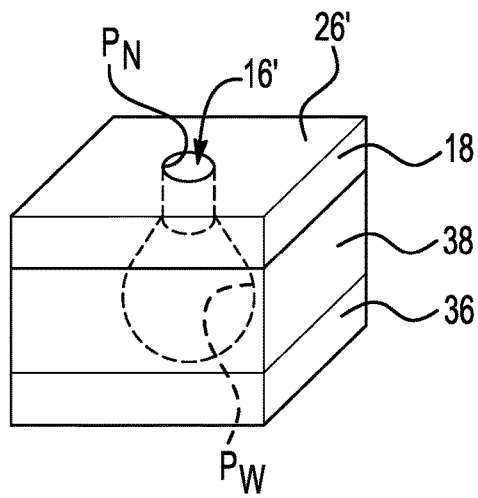
Figure 8:
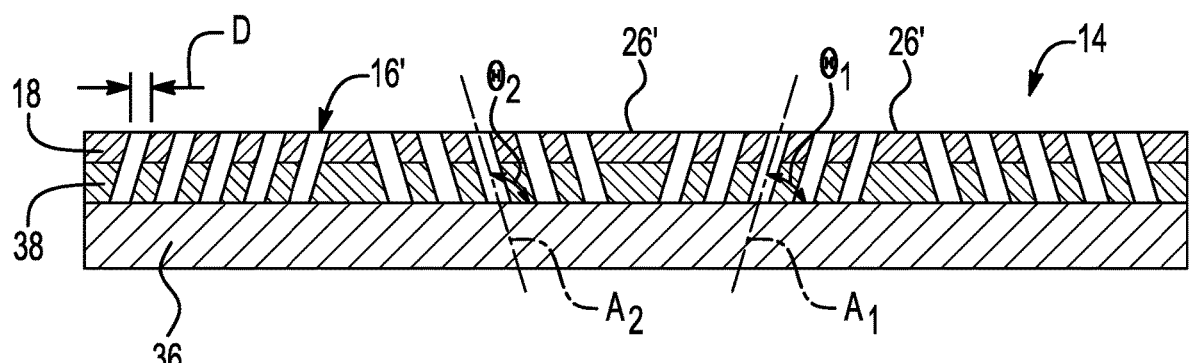
Figure 9A:
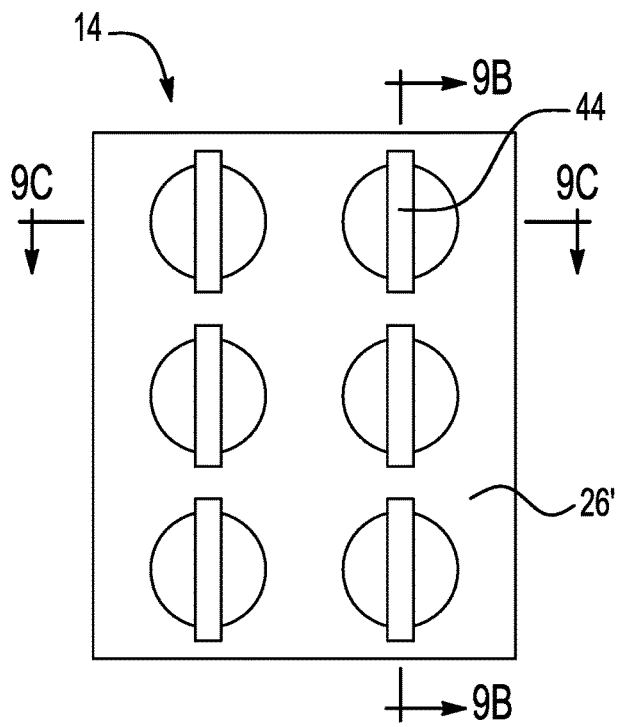
Figure 9B:
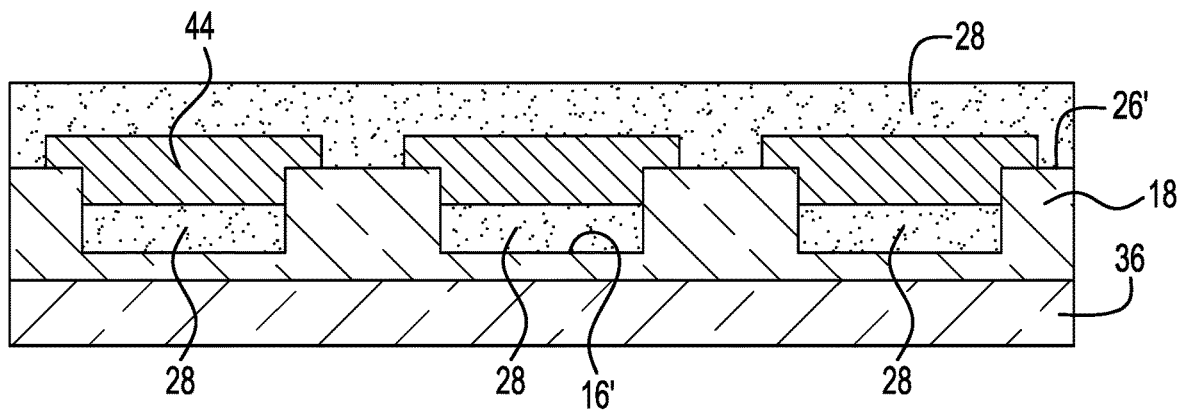
Figure 9C:
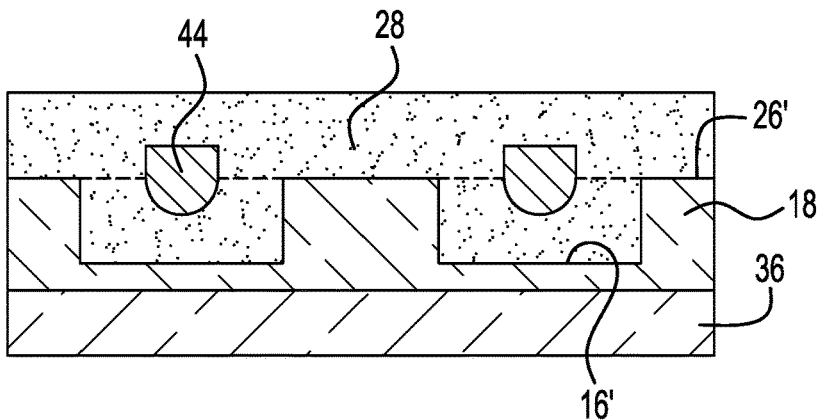
Figure 10A:
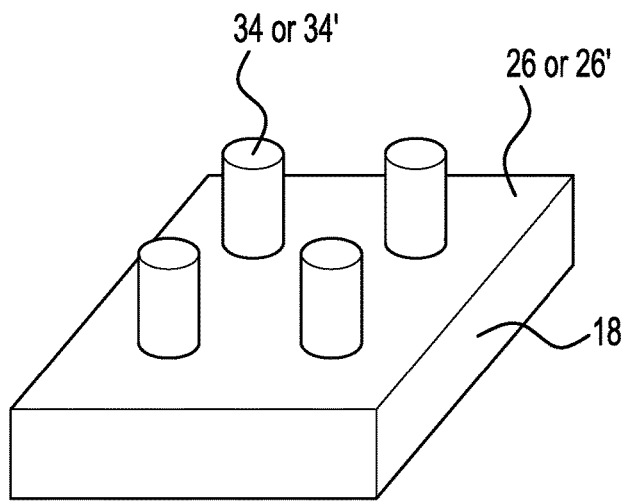
Figure 10B:
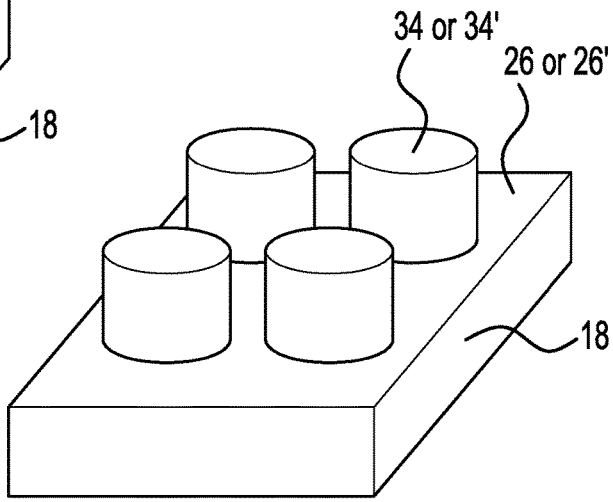
Figure 11:
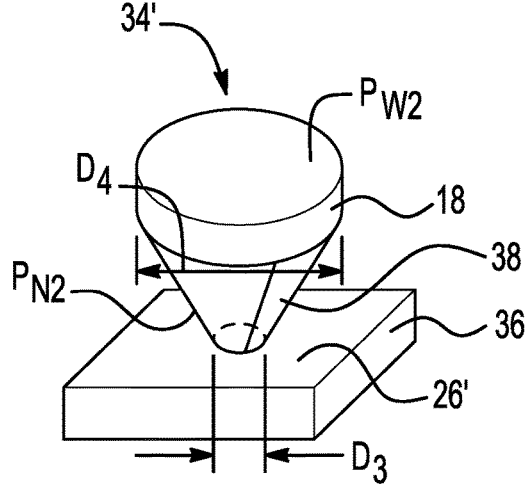
Figure 12:
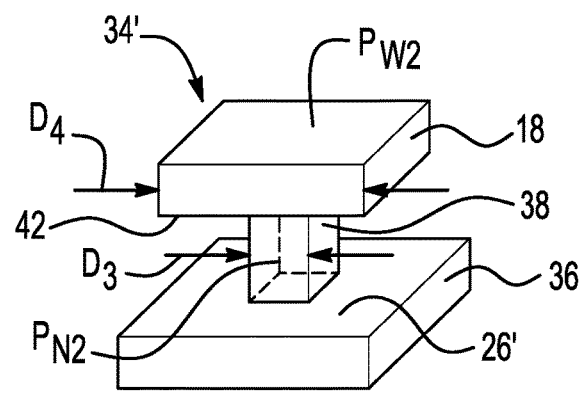
Figure 13:
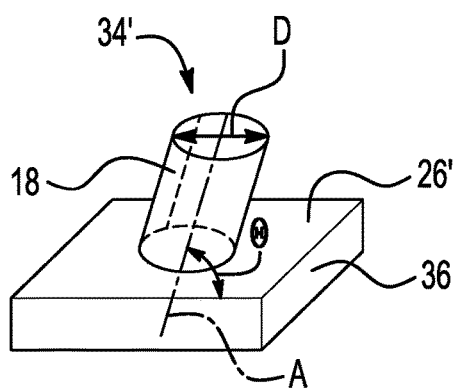
Figure 14A:
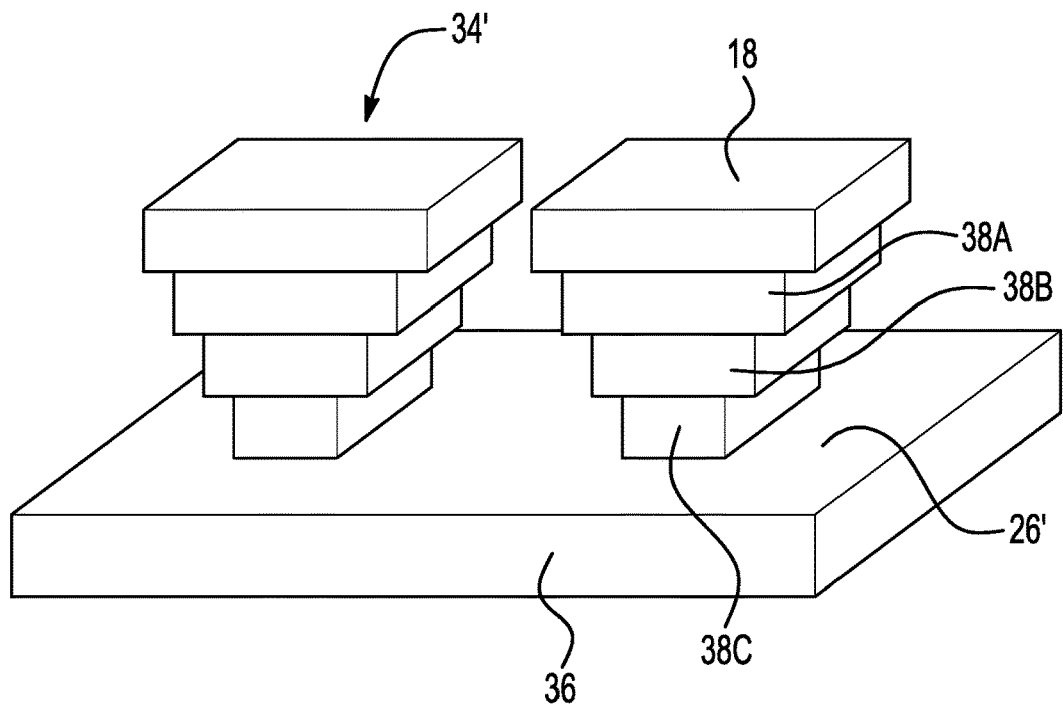
Figure 14B:
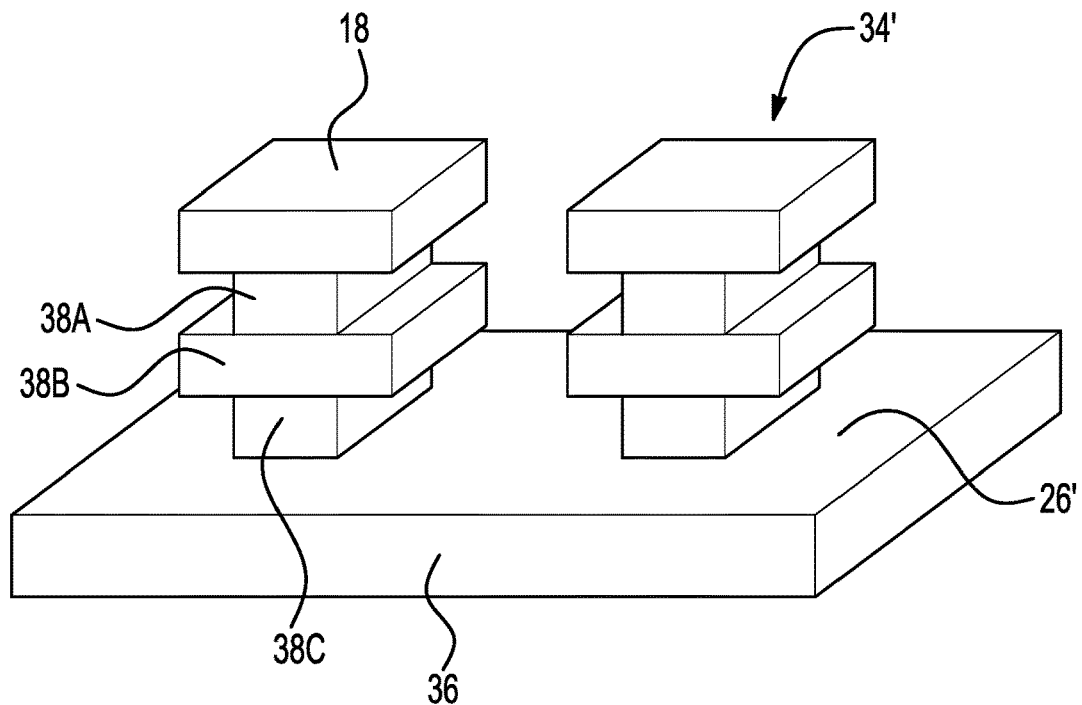
Figure 15:
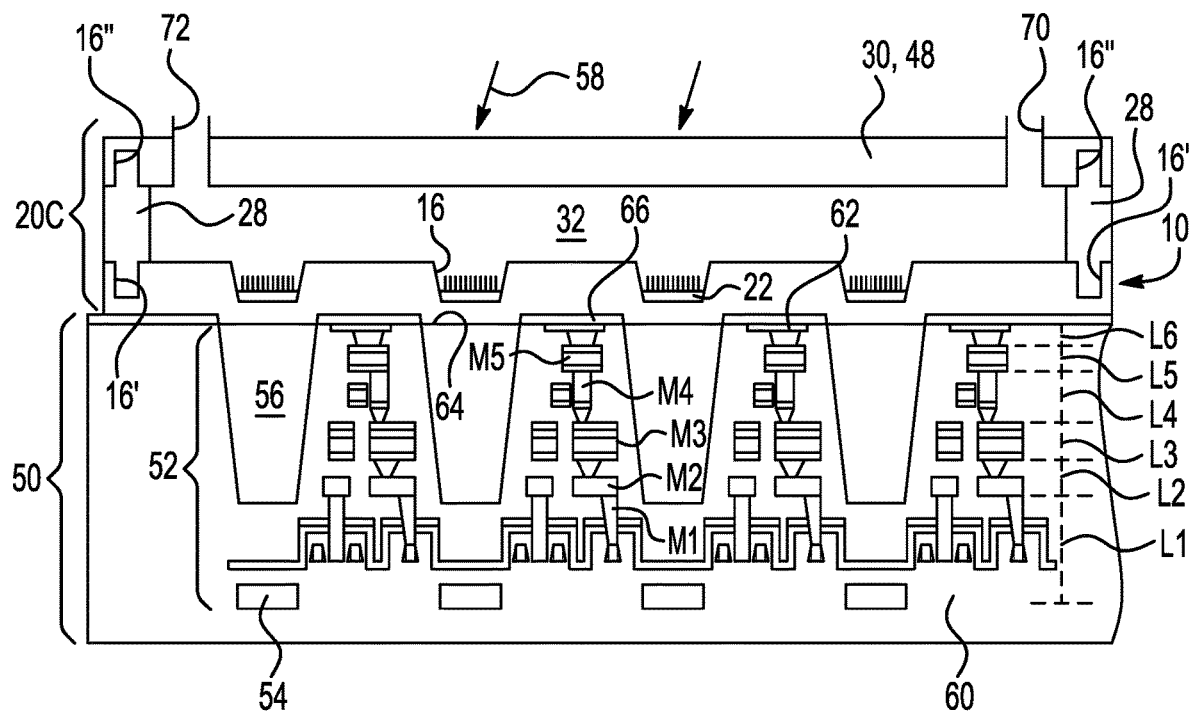
Figure 16A:
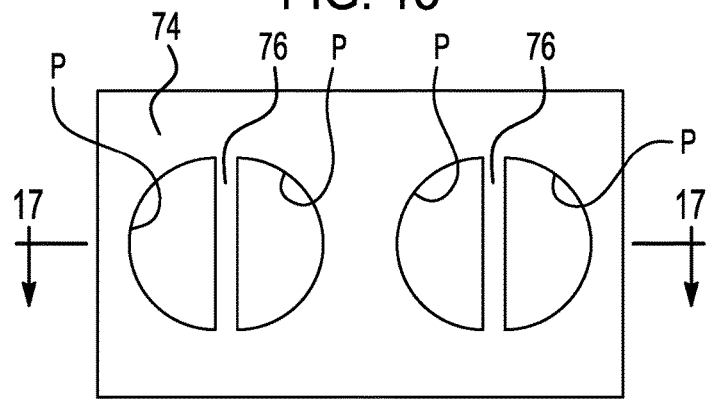
Figure 16B:
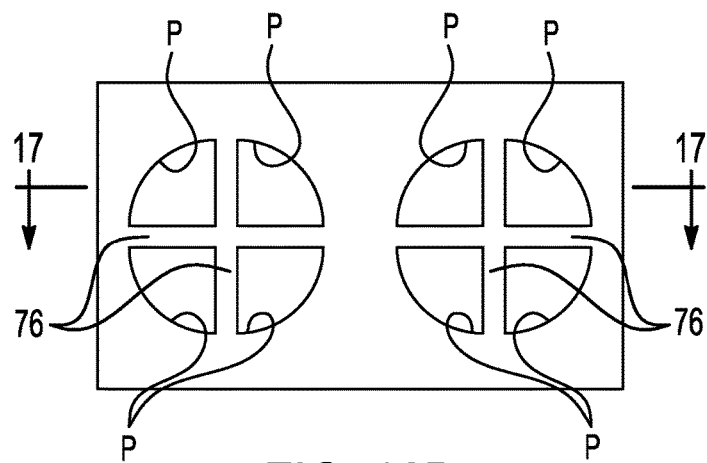
Figure 17:
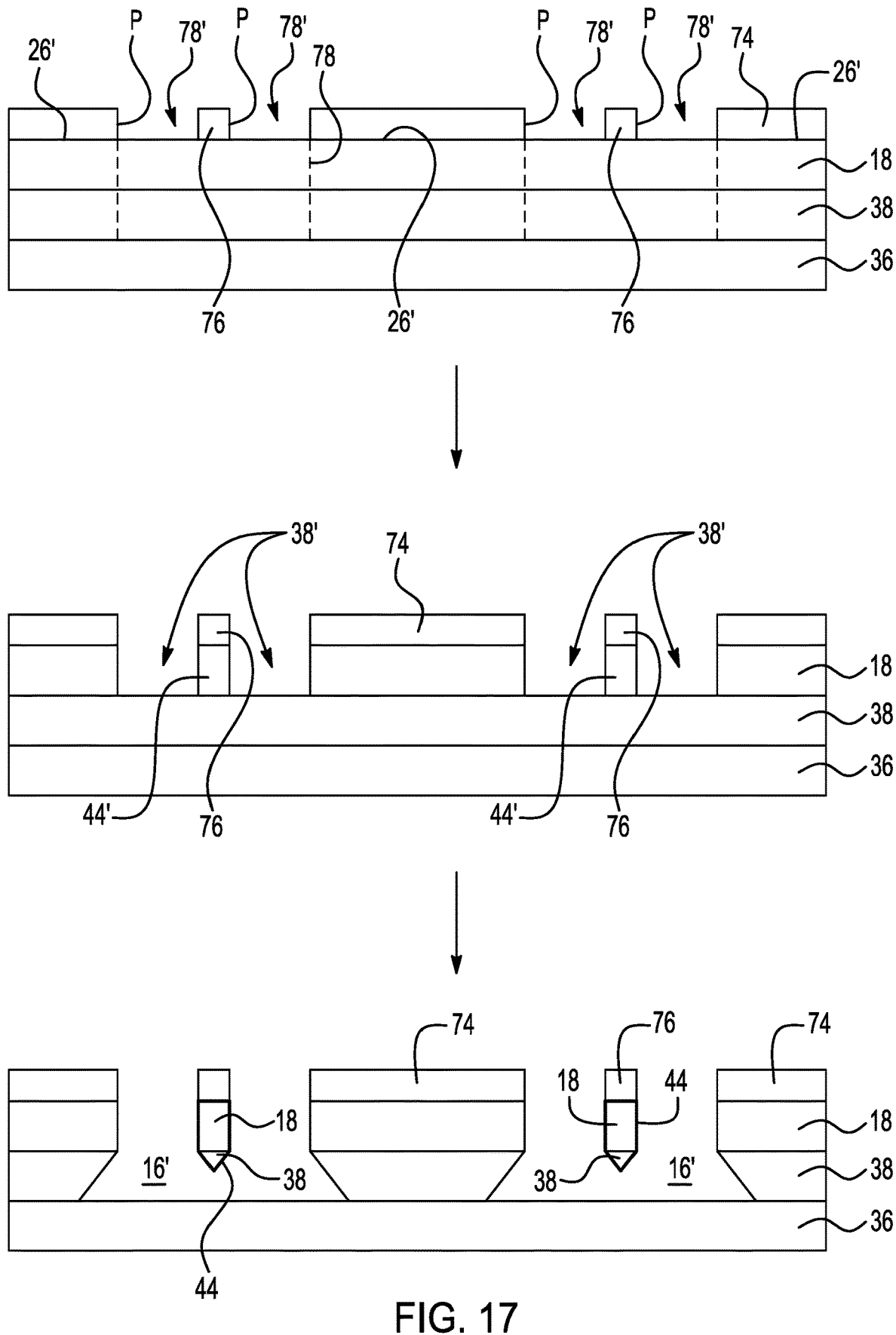
Figure 18:
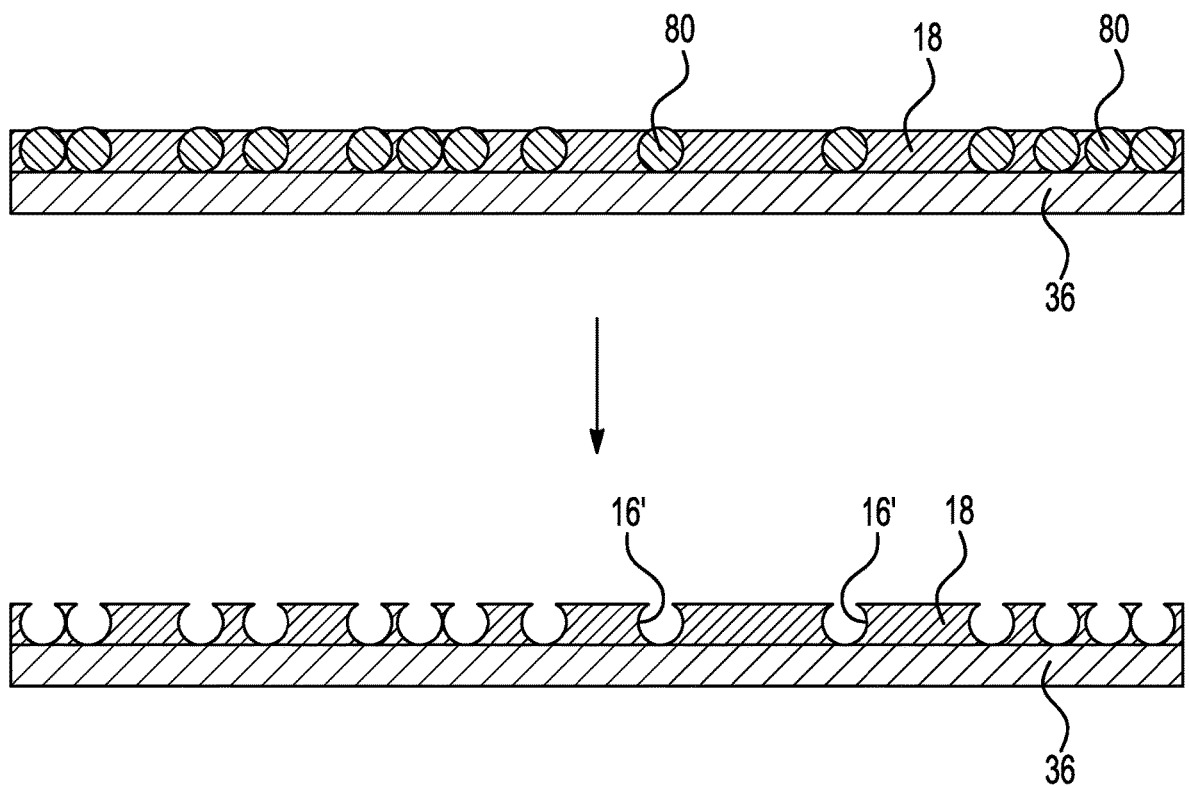
Figure 19A:
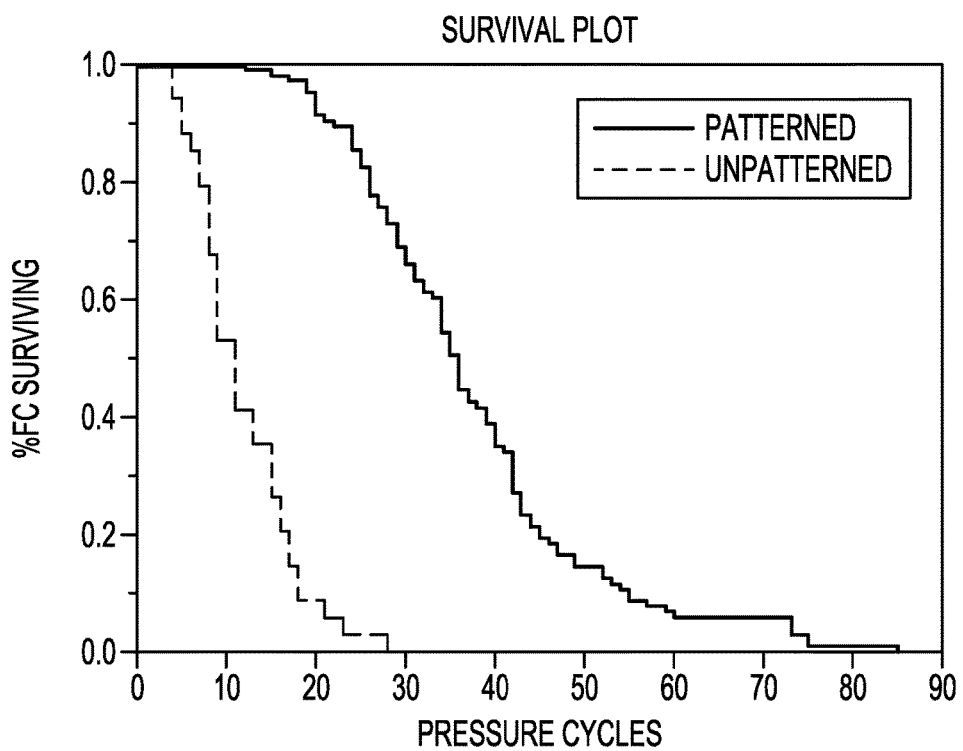
Figure 19B:
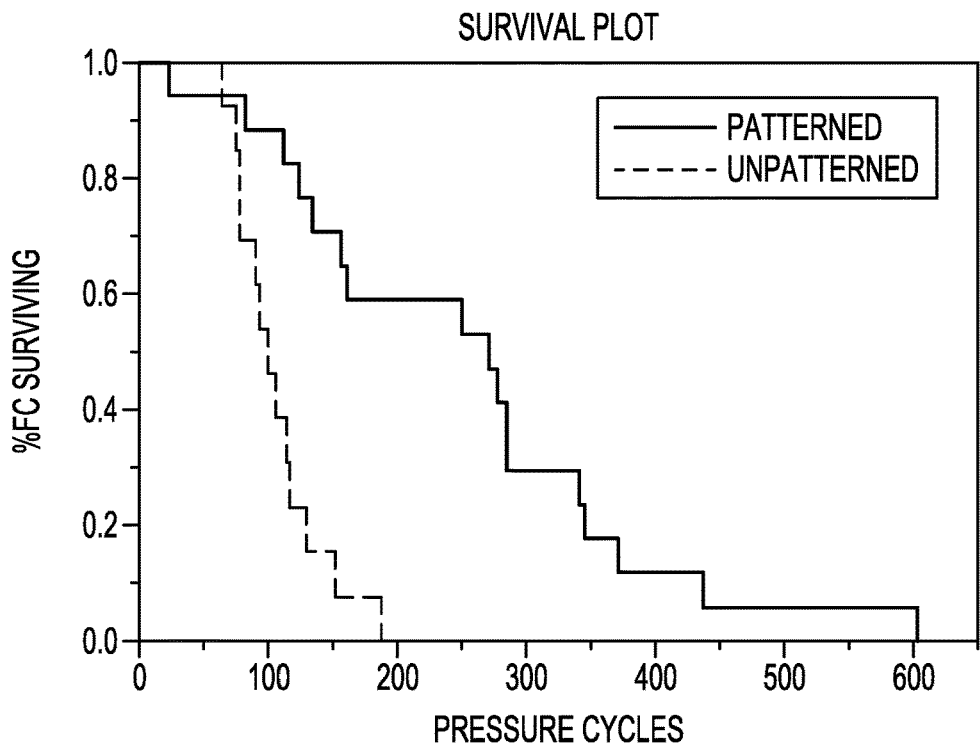
Figure 19C:
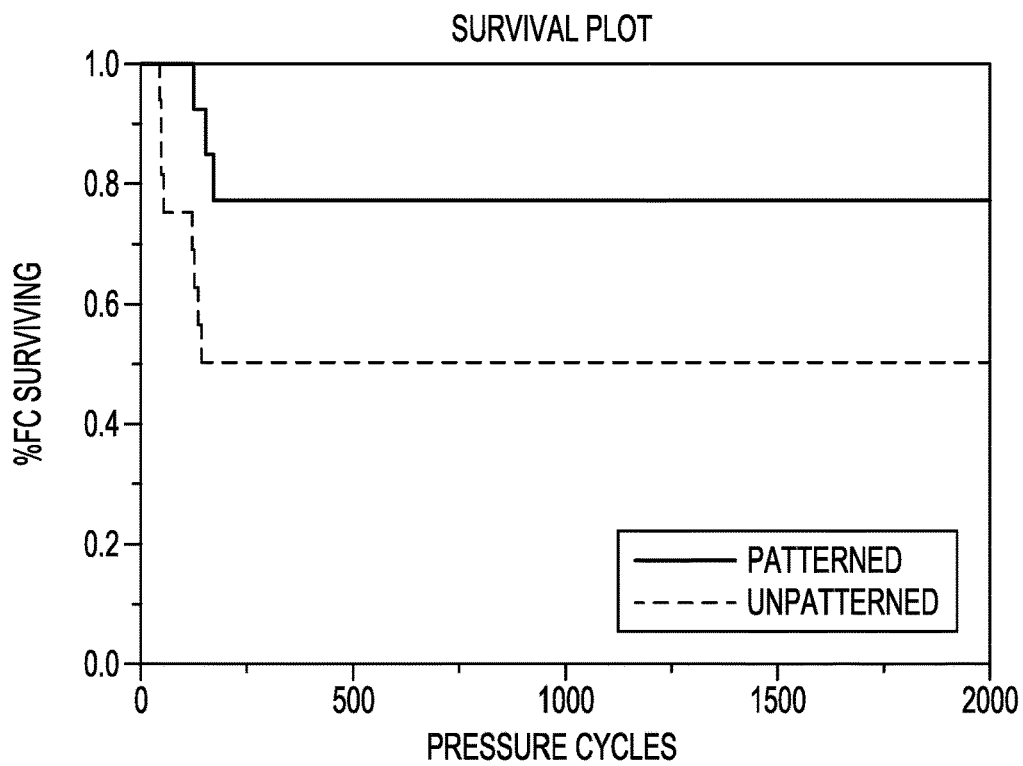

Each of FIG. 3A through FIG. 3B is a perspective view of different depressions formed in a layer of a patterned substrate;

Each of FIG. 4A through FIG. 4G is a cross-sectional view of different geometries for depressions in the bonding region of a patterned substrate;

FIG. 5 is a perspective view of the depression geometry shown in FIG. 4A;

FIG. 6 is a perspective view of the depression geometry shown in FIG. 4B;

FIG. 7 is a perspective view of the depression geometry shown in FIG. 4C;

FIG. 8 is a cross-sectional view of yet another geometry for the depressions in the bonding region of a patterned substrate;

FIG. 9A is a top view of a bonding region including depressions and features suspended over each of the depressions;

FIG. 9B is a cross-sectional view taken along line 9B-9B of FIG. 9A;

FIG. 9C is a cross-sectional view taken along line 9C-9C of FIG. 9A;

FIG. 10A and FIG. 10B are perspective views of different posts formed on a layer of a patterned substrate;

FIG. 11 is a perspective view of one example of a geometry for the posts in the bonding region of a patterned substrate;

FIG. 12 is a perspective view of another example of a geometry for the posts in the bonding region of a patterned substrate;

FIG. 13 is a perspective view of still another example of a geometry for the posts in the bonding region of a patterned substrate;

Each of FIG. 14A and FIG. 14B is a perspective view of another example of a geometry for the posts in the bonding region of a patterned substrate;

FIG. 15 is a cross-sectional view of a complementary metal-oxide semiconductor (CMOS) integrated with an example of the flow cells disclosed herein;

Each of FIG. 16A and FIG. 16B is a top view of a photoresist pattern used to form an example of a bonding region including depressions and features suspended over each of the depressions;

FIG. 17 depicts a schematic flow diagram illustrating an example method using the photoresist pattern of either FIG. 16A or FIG. 16B;

FIG. 18 depicts a schematic flow diagram illustrating another example method for making the depressions in the bonding region of a patterned substrate; and FIG. 19A through FIG. 19C are graphs depicting the results of cyclical pressure tests, with the percentage of flow cells surviving the pressure test being depicted on the Y axis and the number of pressure cycles on the X axis.

DETAILED DESCRIPTION

The flow cells disclosed herein include at least one patterned substrate that includes a patterned active region and a patterned bonding region. The patterned active region includes depressions or posts that are functionalized with surface chemistry that facilitates desired reaction(s). The patterned bonding region includes depressions or posts that are not functionalized with the surface chemistry, but rather, that increase the surface that is available for bonding with an adhesive.

In some examples, the patterned substrate(s) is/are incorporated into flow cells that are suitable for optical detection of the reaction(s). In other examples, the patterned substrate is incorporated into a flow cell that is integrated over a solid-state imager, such as a complementary metal-oxide semiconductor (CMOS) imager. In these examples, the flow cell is suitable for optical detection of the reaction(s).

Definitions

It is to be understood that terms used herein will take on their ordinary meaning in the relevant art unless specified otherwise. Several terms used herein and their meanings are set forth below.

The singular forms "a", "an", and "the" include plural referents unless the context clearly dictates otherwise.

The terms comprising, including, containing and various forms of these terms are synonymous with each other and are meant to be equally broad.

The terms top, bottom, lower, upper, on, etc. are used herein to describe the flow cell and/or the various components of the flow cell. It is to be understood that these directional terms are not meant to imply a specific orientation, but are used to designate relative orientation between components. The use of directional terms should not be interpreted to limit the examples disclosed herein to any specific orientation(s).

The terms first, second, etc. also are not meant to imply a specific orientation or order, but rather are used to distinguish one component from another.

It is to be understood that the ranges provided herein include the stated range and any value or sub-range within the stated range, as if such values or sub-ranges were explicitly recited. For example, a range of about 400 nm to about 1 μm (1000 nm), should be interpreted to include not only the explicitly recited limits of about 400 nm to about 1 μm, but also to include individual values, such as about 708 nm, about 945.5 nm, etc., and sub-ranges, such as from about 425 nm to about 825 nm, from about 550 nm to about 940 nm, etc. Furthermore, when "about" and/or "substantially" are/is utilized to describe a value, they are meant to encompass minor variations (up to +/−10%) from the stated value.

The term "active region" refers to an area of a patterned substrate that includes features (i.e., depressions or posts) that support surface chemistry, which facilitates a desired reaction that is be detected when a flow cell containing the patterned substrate is in operation.

As used herein, the term "attached" refers to the state of two things being joined, fastened, adhered, connected or bound to each other, either directly or indirectly. As examples, bonds that form may be covalent or non-covalent. A covalent bond is characterized by the sharing of pairs of electrons between atoms. A non-covalent bond is a physical bond that does not involve the sharing of pairs of electrons and can include, for example, hydrogen bonds, ionic bonds, van der Waals forces, hydrophilic interactions and hydrophobic interactions.

As used herein, a "bonding region" refers to an area of a patterned substrate that is to be bonded to another material, which may be, as examples, a lid, another patterned substrate, or a partially patterned substrate. In the examples disclosed herein, the bond that is formed at the bonding region is a chemical bond.

The term "depositing," as used herein, refers to any suitable application technique, which may be manual or automated, and, in some instances, results in modification of the surface properties. Generally, depositing may be performed using vapor deposition techniques, coating techniques, grafting techniques, or the like. Some specific examples include chemical vapor deposition (CVD), spray coating (e.g., ultrasonic spray coating), spin coating, dunk or dip coating, doctor blade coating, puddle dispensing, flow through coating, aerosol printing, screen printing, microcontact printing, inkjet printing, or the like.

As used herein, the term "depression" refers to a discrete concave feature of a substrate, where the depression has a surface opening that is at least partially surrounded by interstitial region(s) of the substrate. Depressions can have any of a variety of shapes at their opening in a surface including, as examples, round, elliptical, square, polygonal, star shaped (with any number of vertices), etc. The cross-section of a depression taken orthogonally with the substrate surface can be curved, square, polygonal, hyperbolic, conical, angular, etc. Several example depressions are described herein.

The term "each," when used in reference to a collection of items, is intended to identify an individual item in the collection, but does not necessarily refer to every item in the collection. Exceptions can occur if explicit disclosure or context clearly dictates otherwise.

As used herein, the term "flow cell" is intended to mean a vessel having a flow channel where a reaction can be carried out, an inlet for delivering reagent(s) to the flow channel, and an outlet for removing reagent(s) from the flow channel. In some examples, the flow cell enables the detection of the reaction that occurs in the chamber. For example, the flow cell may include one or more transparent surfaces allowing for the optical detection of arrays, optically labeled molecules, or the like within the flow channel.

As used herein, a "flow channel" or "channel" may be an area defined between two bonded components, which can selectively receive a liquid sample. In some examples, the flow channel may be defined between a patterned substrate and a lid, and thus may be in fluid communication with one or more depressions or ports defined in or on the patterned substrate. The flow channel may also be defined between two patterned substrates that are bonded together or a patterned substrate and a partially patterned substrate.

As used herein, the term "interstitial region" refers to an area, e.g., of a substrate, that separates features, e.g., depressions or posts, that are defined in or on the substrate. For example, an interstitial region can separate one depression or post of an array from another depression or post of the array. The two depressions or posts that are separated from each other can be discrete, i.e., lacking physical contact with each other. In the examples disclosed herein, the interstitial region is continuous whereas the depressions or posts are discrete, for example, as is the case for a plurality of depressions defined in an otherwise continuous surface or a plurality of posts formed on an otherwise continuous surface.

As used herein, a "negative photoresist" refers to a light sensitive material in which a portion that is exposed to light of particular wavelength(s) becomes insoluble to a developer. In these examples, the insoluble negative photoresist has less than 5% solubility in the developer. With the negative photoresist, the light exposure changes the chemical structure so that the exposed portions of the material becomes less soluble (than non-exposed portions) in the developer. While not soluble in the developer, the insoluble negative photoresist may be at least 99% soluble in a remover that is different from the developer. The remover may be a solvent or solvent mixture used, e.g., in a lift-off process.

In contrast to the insoluble negative photoresist, any portion of the negative photoresist that is not exposed to light is at least 95% soluble in the developer. This portion may be referred to as a "soluble negative photoresist." In some examples, the soluble negative photoresist is at least 98%, e.g., 99%, 99.5%, 100%, soluble in the developer.

As used herein, a "nucleotide" includes a nitrogen containing heterocyclic base, a sugar, and one or more phosphate groups. Nucleotides are monomeric units of a nucleic acid sequence. In ribonucleic acids (RNA), the sugar is a ribose, and in deoxyribonucleic acids (DNA), the sugar is a deoxyribose, i.e., a sugar lacking a hydroxyl group that is present at the 2' position in ribose. The nitrogen containing heterocyclic base (i.e., nucleobase) can be a purine base or a pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine. A nucleic acid analog may have any of the phosphate backbone, the sugar, or the nucleobase altered. Examples of nucleic acid analogs include, for example, universal bases or phosphate-sugar backbone analogs, such as peptide nucleic acid (PNA).

The term "polymeric hydrogel" refers to a semi-rigid polymer that is permeable to liquids and gases. The polymeric hydrogel can swell when liquid (e.g., water) is taken up and that can contract when liquid is removed, e.g., by drying. While a hydrogel may absorb water, it is not water-soluble.

As used herein, a "positive photoresist" refers to a light sensitive material in which a portion that is exposed to light of particular wavelength(s) becomes soluble to a developer. In these examples, any portion of the positive photoresist exposed to light is at least 95% soluble in the developer. This portion may be referred to herein as a "soluble positive photoresist". In some examples, the portion of the positive photoresist exposed to light (i.e., the soluble photoresist), is at least 98%, e.g., 99%, 99.5%, 100%, soluble in the developer. With the positive photoresist, the light exposure changes the chemical structure so that the exposed portions of the material become more soluble (than non-exposed portions) in the developer.

In contrast to the soluble positive photoresist, any portion of the positive photoresist not exposed to light is insoluble (less than 5% soluble) in the developer. This portion may be referred to as an "insoluble positive photoresist". While not soluble in the developer, the insoluble positive photoresist may be at least 99% soluble in a remover that is different from the developer. In some examples, the insoluble positive photoresist is at least 98%, e.g., 99%, 99.5%, 100%, soluble in the remover. The remover may be a solvent or solvent mixture used in a lift-off process.

As used herein, the term "post" refers to a discrete convex feature of a substrate, where the post has a base portion that is at least partially surrounded by interstitial region(s) of the substrate, and has a top surface that is positioned a spaced distance from the base portion by a post body. Posts can have any of a variety of shapes at the top portion including, as examples, round, elliptical, square, polygonal, star shaped (with any number of vertices), etc. The cross-section of a post taken orthogonally with the substrate surface can be curved, square, polygonal, hyperbolic, conical, angular, etc. Several example posts are described herein.

As used herein, the term "primer" is defined as a single stranded nucleic acid sequence (e.g., single strand DNA). Some primers are part of a primer set, which serve as a starting point for template amplification and cluster generation. Other primers, referred to herein as sequencing primers, serve as a starting point for DNA synthesis. The 5' terminus of each primer in a primer set may be modified to allow a coupling reaction with a functional group of a polymer chain. The primer length can be any number of bases long and can include a variety of non-natural nucleotides. In an example, the sequencing primer is a short strand, ranging from 10 to 60 bases, or from 20 to 40 bases.

The term "partially patterned substrate" refers to a single layer or multi-layer support that includes a bonding region, but no active region.

The term "patterned substrate" refers to a single layer or multi-layer support that includes an active region and a bonding region.

The term "surface chemistry" refers to the polymeric hydrogel and the primers that facilitate a desired reaction that is to be detected when a flow cell containing the patterned substrate is in operation.

The term "transparent" refers to a material, e.g., in the form of a layer, that is capable of transmitting a particular wavelength or range of wavelengths. For example, the material may be transparent to wavelength(s) that are used in a sequencing operation. Transparency may be quantified using transmittance, i.e., the ratio of light energy falling on a body to that transmitted through the body. The transmittance of a transparent layer will depend upon the thickness of the layer, the wavelength of light, and the dosage of the light to which it is exposed. In the examples disclosed herein, the transmittance of the transparent metal layer may range from 0.1 (10%) to 1 (100%). The material of the transparent metal layer may be a pure material, a material with some impurities, or a mixture of materials, as long as the resulting layer is capable of the desired transmittance.

Flow Cells

Figure 1:
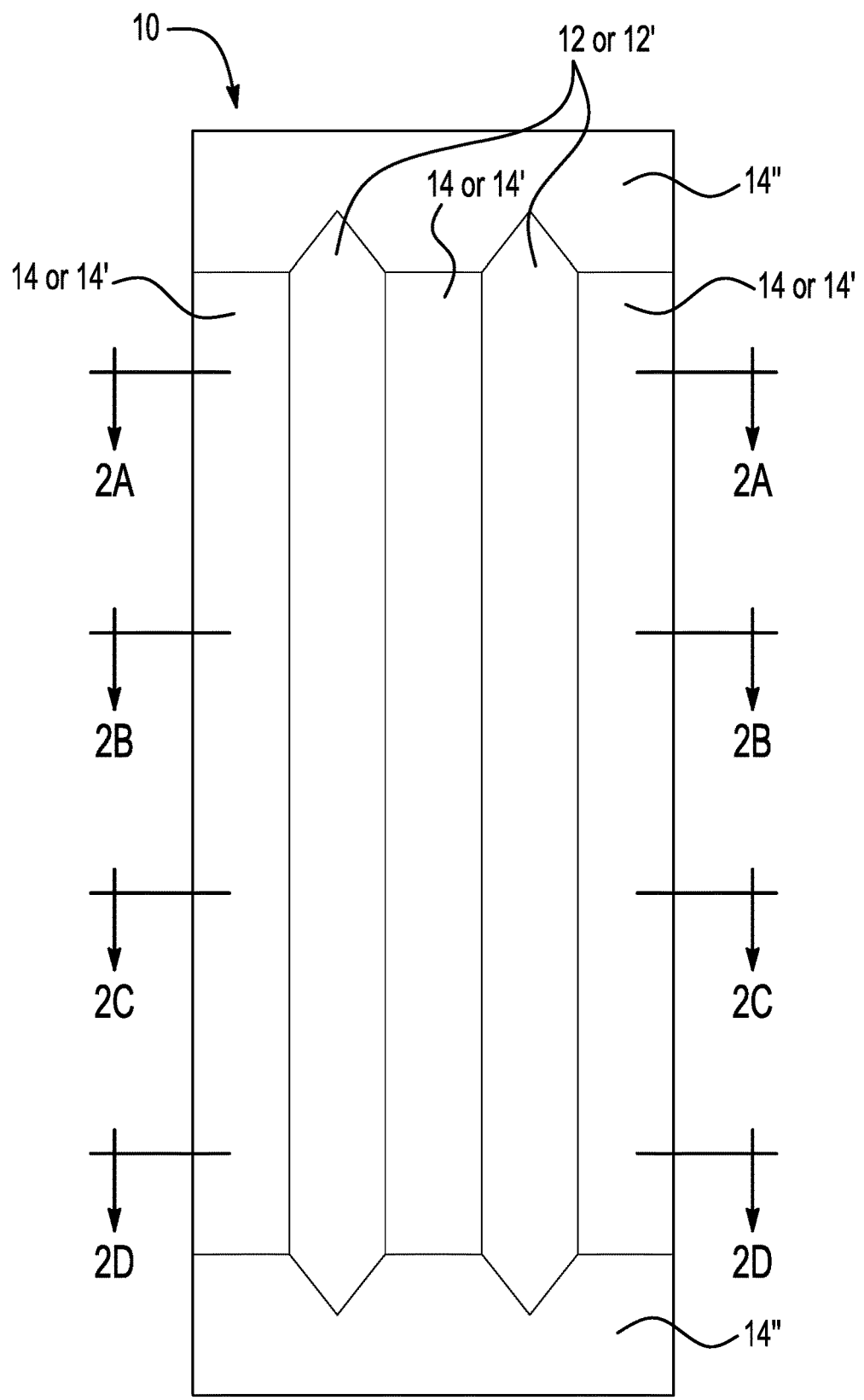
FIG. 1 is a top view of an example of a patterned substrate including active regions and bonding regions.

Examples of the flow cell disclosed herein include at least one patterned substrate. A top view of an example of the patterned substrate 10 is shown in FIG. 1. The patterned substrate 10 includes an active region 12 or 12' and a bonding region 14 or 14' and 14" that at least partially surrounds the active region 12 or 12'.

The patterned substrate 10 shown in FIG. 1 includes two active regions 12 or 12' and respective bonding regions 14 or 14' flanking the active regions 12 or 12'. While two active regions 12 or 12' are shown in FIG. 1, it is to be understood that any number of active regions 12 or 12' may be included in the patterned substrate 10 (e.g., a single active region 12 or 12', four active regions 12 or 12', eight active regions 12 or 12', etc.). Each active region 12 or 12' is isolated from each other active region 12 or 12' (e.g., by the bonding region 14 or 14') so that fluid introduced into any particular active region 12 or 12' does not flow into any other active region 12 or 12'.

In an example, active regions 12 or 12' have a substantially rectangular configuration with pointed or rounded ends. The length and width of the active regions 12 or 12' may be smaller, respectively, than the length and width of the layer 18 (see, e.g., FIG. 2A) in which the active regions 12 or 12' are formed so that a portion of the layer 18 surrounding each active region 12 or 12' is available as the bonding region 14 or 14' and 14", i.e., for attachment to a cover 30. Examples of the cover 30 include a lid 46 (FIG. 2A and FIG. 2B), a partially patterned substrate 48 (FIG. 2C), or another patterned substrate 10" (FIG. 2D). In some instances, the width of each active region 12 or 12' can be at least about 1 mm, at least about 2.5 mm, at least about 5 mm, at least about 7 mm, at least about 10 mm, or more. In some instances, the length of each active region 12 or 12' can be at least about 10 mm, at least about 25 mm, at least about 50 mm, at least about 100 mm, or more. The width and/or length of each active region 12 or 12' can be greater than, less than or between the values specified above.

Figure 2A:
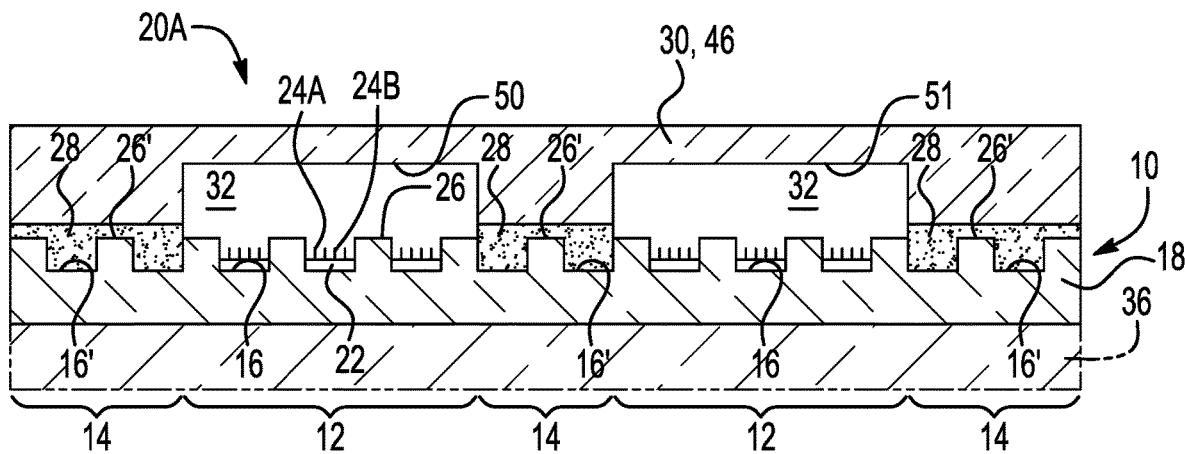
FIG. 2A is a cross-sectional view taken along line 2A-2A of FIG. 1 illustrating an example of a flow cell including one example of the patterned substrate of FIG. 1.

The bonding regions 14 or 14' flanking the longer sides of the active regions 12 or 12' are patterned with depressions 16' (see, e.g., FIG. 2A) or posts 34' (see, e.g., FIG. 2B) that increase the surface area of the layer 18 that will contact an adhesive 28 (see, e.g., FIG. 2A).

In an example, bonding regions 14 or 14' have a rectangular configuration. The length and width of the bonding regions 14 or 14' may be the same as, respectively, the length and width of the active regions 12 or 12'. Alternatively, the length and width of the bonding regions 14 or 14' may be slightly smaller than, respectively, the length and width of the active regions 12 or 12'. In some instances, the width of each bonding region 14 or 14' can be at least about 1 mm, at least about 2.5 mm, at least about 5 mm, at least about 7 mm, at least about 10 mm, or more. In some instances, the length of each bonding region 14 or 14' can be at least about 10 mm, at least about 25 mm, at least about 50 mm, at least about 100 mm, or more. The width and/or length of each bonding regions 14 or 14' can be greater than, less than or between the values specified above.

Another bonding region 14" flanks the shorter sides of the active regions 12 or 12' and the shorter sides of the bonding region 14 or 14'. This bonding region 14" is not patterned with depressions 16' or posts 34', but rather is a substantially flat portion of the layer 18.

Examples of the flow cell 20A, 20B, 20C, 20D that include at least one patterned substrate 10 are shown in FIG. 2A, FIG. 2B, FIG. 2C, and FIG. 2D. The example flow cells 20A, 20C, 20D shown in FIG. 2A, FIG. 2C, and FIG. 2D include one example of the patterned substrate 10, which has the active region 12 and the bonding region 14, 14' that at least partially surrounds the active region 12, wherein the active region 12 includes first depressions 16 defined in a layer 18 of the patterned structure 10, surface chemistry (e.g., polymeric hydrogel 22 and primers 24A, 24B) positioned in the first depressions 16, and first interstitial regions 26 surrounding the first depressions 16; and wherein the bonding region 14 includes second depressions 16' defined in the layer 18 and second interstitial regions 26' surrounding the second depressions 16'; an adhesive 28 positioned in the second depressions 16' and on the second interstitial regions 26'; and a cover 30 attached to the adhesive 28 such that a flow channel 32 is defined between a portion of the cover 30 and the active region 12.

Figure 2B:
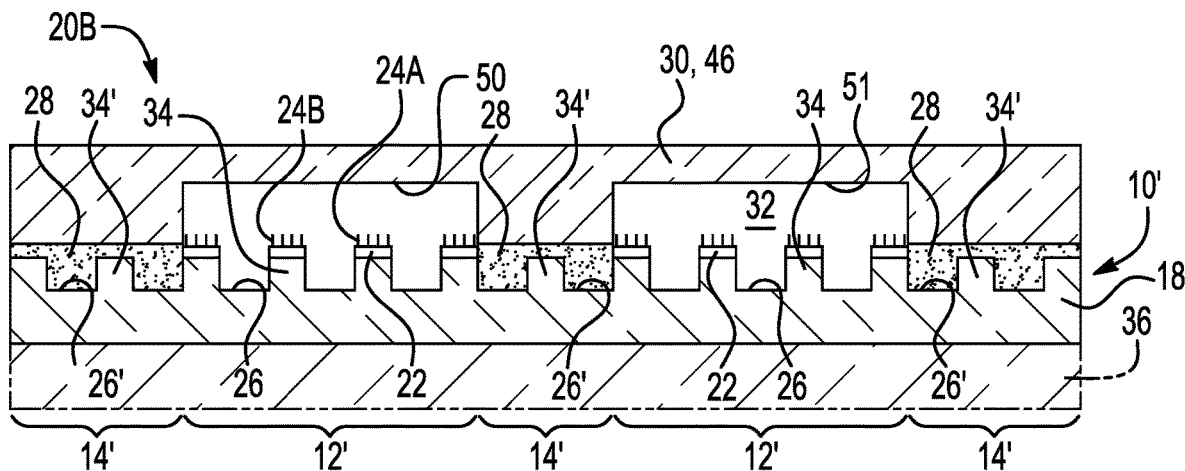
FIG. 2B is a cross-sectional view taken along line 2B-2B of FIG. 1 illustrating an example of a flow cell including another example of the patterned substrate of FIG. 1.

The example flow cell 20B shown in FIG. 2B includes another example of the patterned substrate 10', which has an active region 12' and a bonding region 14' that at least partially surrounds the active region 12', wherein the active region 12' includes first posts 34 defined in a layer 18 of the patterned substrate 10', surface chemistry (e.g., polymeric hydrogel 22 and primers 24A, 24B) positioned over the first posts 34, and first interstitial regions 26 surrounding the first posts 34; and wherein the bonding region 14' includes second posts 34' defined in the layer 18 and second interstitial regions 26' surrounding the second posts 34'; an adhesive 28 positioned over the second interstitial regions 26' and over the second posts 34'; and a cover 30 attached to the adhesive 28 such that a flow channel 32 is defined between a portion of the cover 30 and the active region 12'.

When the flow cell 20A, 20B, 20C, 20D is to be used with an optical detection device, the layer 18 may be a single layer substrate that is patterned, or may be part of a multi-layered substrate including the layer 18 (which is patterned) positioned over one or more additional layers.

When the layer 18 is a single layer substrate, the layer 18 may be any support material that can be patterned with the depressions 16, 16' or posts 34, 34'. Examples of suitable materials for the single layer substrate include epoxy siloxane, glass, modified or functionalized glass, plastics (including acrylics, polystyrene and copolymers of styrene and other materials, polypropylene, polyethylene, polybutylene, polyurethanes, polytetrafluoroethylene (such as TEFLON® from Chemours), cyclic olefins/cyclo-olefin polymers (COP) (such as ZEONOR® from Zeon), polyimides, etc.), nylon (polyamides), ceramics/ceramic oxides, silica, fused silica, or silica-based materials, aluminum silicate, silicon and modified silicon (e.g., boron doped p+ silicon), silicon nitride ($Si_3N_4$), silicon oxide ($SiO_2$), tantalum pentoxide ($Ta_2O_5$) or other tantalum oxide(s) ($TaO_x$), hafnium oxide ($HfO_2$), carbon, metals, inorganic glasses, or the like. In some instances, the single layer substrate is selected to be transparent to the excitation and emission wavelengths used in optical detection of the reaction(s) taking place within the flow cell 20A, 20B, 20C, 20D.

An example of a multi-layered substrate includes the layer 18, which is patterned with the depressions 16, 16' or posts 34, 34', and is positioned over a base support 36. As one example, the layer 18 may be an inorganic oxide that is selectively applied to the base support 36 in a desired pattern. Examples of suitable inorganic oxides include tantalum oxide (e.g., $Ta_2O_5$), aluminum oxide (e.g., $Al_2O_3$), silicon oxide (e.g., $SiO_2$), hafnium oxide (e.g., $HfO_2$), etc. As another example, the layer 18 may be a resin matrix material that is applied to the base support 36 and then patterned. Some examples of suitable resins include a polyhedral oligomeric silsesquioxane-based resin, a non-polyhedral oligomeric silsesquioxane epoxy resin, a poly(ethylene glycol) resin, a polyether resin (e.g., ring opened epoxies), an acrylic resin, an acrylate resin, a methacrylate resin, an amorphous fluoropolymer resin (e.g., CYTOP® from Bellex), and combinations thereof.

As used herein, the term "polyhedral oligomeric silsesquioxane" (commercially available under the tradename POSS® from Hybrid Plastics) refers to a chemical composition that is a hybrid intermediate (e.g., $RSiO_{1.5}$) between that of silica ($SiO_2$) and silicone ($R_2SiO$). An example of polyhedral oligomeric silsesquioxane can be that described in Kehagias et al., Microelectronic Engineering 86 (2009), pp. 776-778, which is incorporated by reference in its entirety. In an example, the composition is an organosilicon compound with the chemical formula $[RSiO_{3/2}]_n$, where the R groups can be the same or different. Example R groups for polyhedral oligomeric silsesquioxane include epoxy, azide/azido, a thiol, a poly(ethylene glycol), a norbornene, a tetrazine, acrylates, and/or methacrylates, or further, for example, alkyl, aryl, alkoxy, and/or haloalkyl groups. The resin composition disclosed herein may include one or more different cage or core structures as monomeric units. The average cage content can be adjusted during the synthesis, and/or controlled by purification methods, and a distribution of cage sizes of the monomeric unit(s) may be used in the examples disclosed herein.

The base support 36 of the multi-layered structure may be any of the examples set forth herein for the single layer substrate.

When the flow cell 20A, 20B, 20C, 20D is to be used with an electronic detection device, the layer 18 may be a passivation layer or one of several stacked passivation layers that are coupled to a complementary metal oxide semiconductor (CMOS) chip (see FIG. 15). In these examples, the layer 18 may provide one level of corrosion protection for an embedded metal layer of the CMOS chip that is closest in proximity to the layer 18. When stacked passivation layers are used, the layer that forms the bottom surface of the depressions 16 or that defines the posts 34 is selected to be transparent to the light emissions (e.g., visible light) resulting from the reaction(s) taking place at the surface chemistry. Also when the stacked passivation layers are used, the outermost layer is selected to be at least initially resistant to the fluidic environment and moisture that may be introduced into or present in the flow channel 32. An at least initially resistant material acts as an etch barrier to high pH reagents (e.g., pH ranging from 8 to 14) and as a moisture barrier. Examples of suitable materials for the passivation layer(s) include silicon nitride ($Si_3N_4$), silicon oxide ($SiO_2$), tantalum oxides (e.g., tantalum pentoxide ($TaO_5$)), hafnium oxide ($HaO_2$), boron doped p+ silicon, or the like. In some examples, the stack of passivation layer(s) may also include non-passivation materials, such as a tantalum layer. While several example materials have been provided, it is to be understood that other layers may be used that provide suitable etch rates for generating the desired depression geometry and passivation (if desired). The total thickness of the passivation layer(s) (including layer 18) may range from about 100 nm to about 500 nm.

Figure 2C:
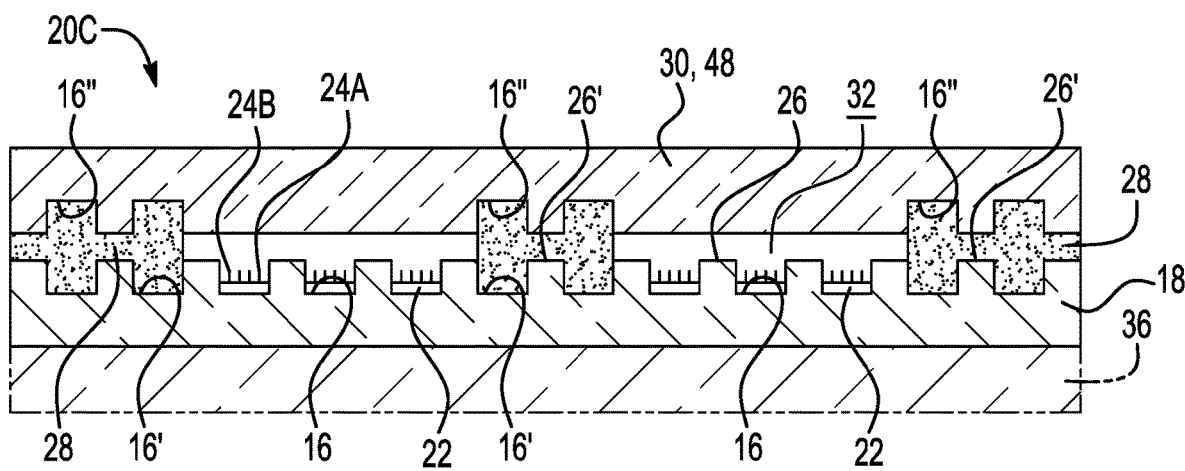
FIG. 2C is a cross-sectional view taken along line 2C-2C of FIG. 1 illustrating an example of a flow cell including still another example of the patterned substrate of FIG. 1.
Figure 2D:
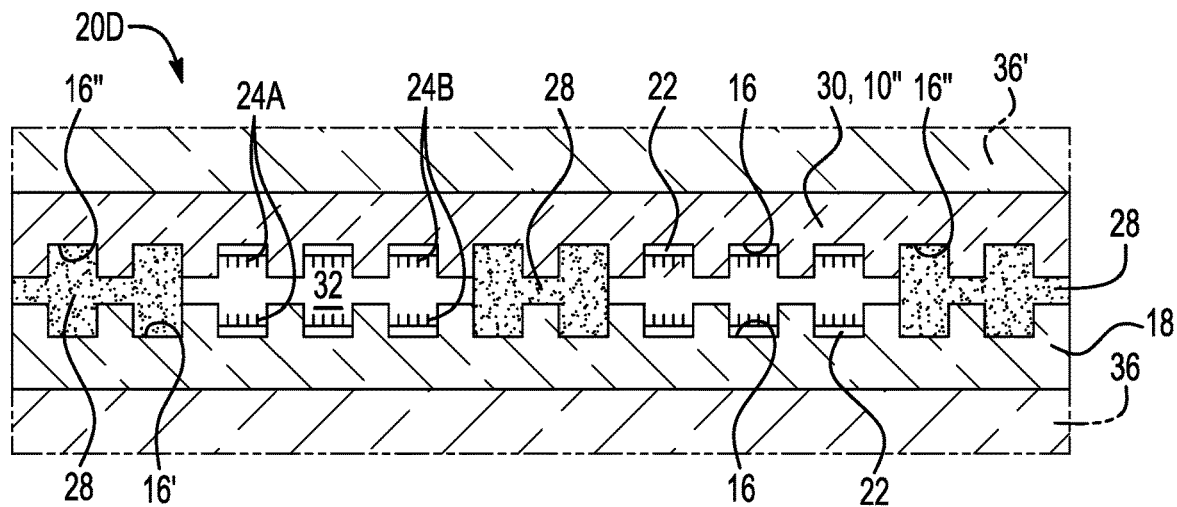
FIG. 2D is a cross-sectional view taken along line 2D-2D of FIG. 1 illustrating an example of a flow cell including yet another example of the patterned substrate of FIG. 1.

In the example shown in FIG. 2A, FIG. 2C, and FIG. 2D, the active region 12 and the bonding region 14 include the depressions 16, 16'.

In some examples, the geometry of each of the first depressions 16 and of each of the second depressions 16' is the same. In other words, in these examples, all of the depressions 16, 16' have the same geometry. In these examples, the geometry of the depressions 16, 16' is selected from the group consisting of a cylinder, an oval cylinder, a sphere, a cube, a cuboid, a lanceoloid, a polygonal prism, and combinations thereof. Examples of suitable polygonal prisms include a triangular prism, a square prism (i.e., a cube), a rectangular prism (i.e., a cuboid), a pentagonal prism, a hexagonal prism, an octagonal prism, or a trapezoidal prism. Any of the shapes that typically have angled corners may have rounded corners instead. Additionally, it is to be understood that depressions 16, 16' that include combinations of geometries have an overall shape that combines two or more of the listed three-dimensional shapes.

Perspective views of some of the geometries of the depressions 16, 16' are shown in FIG. 3A and FIG. 3B. In particular: a perspective view of the cylindrical depressions 16, 16' is shown in FIG. 3A; and a perspective view of the oval cylindrical depressions 16, 16' is shown in FIG. 3B.

Each depression 16, 16' is a three-dimensional space that extends inward (downward) from the surface of the layer 18. Thus, the depressions 16, 16' are concave regions with respect to the interstitial regions 26, 26' of the layer 18 that respectively surround the depressions 16, 16'.

The layout or pattern of the depressions 16 in the active region 12 may be the same as or different than the layout or pattern of the depressions 16' in the bonding region 14. The respective layouts may be regular, repeating, or non-regular patterns. In an example, the depressions 16, 16' in the active and bonding regions 12, 14 are disposed in a hexagonal grid for close packing and improved density. Other layouts may include, for example, rectangular layouts, triangular layouts, and so forth. In some examples, the layout or pattern can be an x-y format of depressions 16 or 16' that are in rows and columns and are separated by the interstitial regions 26 or 26'. The depressions 16 or 16' may be aligned in other patterns, such as stripes, swirls, lines, triangles, rectangles, circles, arcs, checks, diagonals, arrows, and/or squares. The depressions 16 or 16' could also be configured as trenches that extend partially along the length or width of the layer 18.

The layout or pattern of the depressions 16 or 16' may be characterized with respect to the density of the respective depressions 16, 16' (e.g., number of depressions 16, 16') in the active region 12 and bonding region 14. For example, the depressions 16 and/or 16' may be present at a density of approximately 2 million per $mm^2$. The density may be tuned to different densities including, for example, a density of about 100 per $mm^2$, about 1,000 per $mm^2$, about 0.1 million per $mm^2$, about 1 million per $mm^2$, about 2 million per $mm^2$, about 5 million per $mm^2$, about 10 million per $mm^2$, about 50 million per $mm^2$, or more, or less. It is to be further understood that the density of the depressions 16 or 16' can be between one of the lower values and one of the upper values selected from the ranges above. As examples, a high density array may be characterized as having depressions 16 or 16' separated by less than about 100 nm, a medium density array may be characterized as having depressions 16 or 16' separated by about 400 nm to about 1 µm, and a low density array may be characterized as having depressions 16 or 16' separated by greater than about 1 µm. While example densities have been provided, it is to be understood that any suitable densities may be used. In some instances, it may be desirable for the spacing between depressions 16 or 16' to be even greater than the examples listed herein.

The layout or pattern of the depressions 16 or 16' may also or alternatively be characterized in terms of the average pitch, or the spacing from the center of one depressions 16 or 16' to the center of an adjacent depressions 16 or 16' (center-to-center spacing) or from the left edge of one depressions 16 or 16' to the right edge of an adjacent depressions 16 or 16' (edge-to-edge spacing). The pattern can be regular, such that the coefficient of variation around the average pitch is small, or the pattern can be non-regular in which case the coefficient of variation can be relatively large. In either case, the average pitch can be, for example, about 50 nm, about 0.1 µm, about 0.5 µm, about 1 µm, about 5 µm, about 10 µm, about 100 µm, or more or less. The average pitch for a particular pattern of depressions 16 or 16' can be between one of the lower values and one of the upper values selected from the ranges above. In an example, the depressions 16 or 16' have a pitch (center-to-center spacing) of about 1.5 µm. While example average pitch values have been provided, it is to be understood that other average pitch values may be used.

The size of each depression 16, 16' may be characterized by its volume, opening area, depth, and/or diameter or length and width.

Each depression 16, 16' can have any volume that is capable of receiving the desired material, such as the surface chemistry for the depressions 16 and the adhesive 28 for the depressions 16'. As examples, the volume can be at least about $1 \times 10^{-3}$ µm³, at least about $1 \times 10^{-2}$ µm³, at least about 0.1 µm³, at least about 1 µm³, at least about 10 µm³, at least about 100 µm³, or more. Alternatively or additionally, the volume can be at most about 1×10⁴ µm³, at most about 1×10³ µm³, at most about 100 µm³, at most about 10 µm³, at most about 1 µm³, at most about 0.1 µm³, or less.

The area occupied by each depression opening can be at least about 1×10⁻³ µm², at least about 1×10⁻² µm², at least about 0.1 µm², at least about 1 µm², at least about 10 µm², at least about 100 µm², or more. Alternatively or additionally, the area can be at most about 1×10³ µm², at most about 100 µm², at most about 10 µm², at most about 1 µm², at most about 0.1 µm², at most about 1×10⁻² µm², or less. The area occupied by each depression opening can be greater than, less than or between the values specified above.

The depth of each depression 16 is large enough to house the surface chemistry, and the depth of each depression 16' depends upon the desired surface area for bonding. The depth may be measured from the surface of the layer 18 to the deepest point at the bottom of the depression 16 or 16'. As examples, the depth of the respective depressions 16, 16' may be at least about 0.1 µm, at least about 0.5 µm, at least about 1 µm, at least about 10 µm, at least about 100 µm, or more. Alternatively or additionally, the depth of the respective depressions 16, 16' can be at most about 1×10³ µm, at most about 100 µm, at most about 10 µm, or less. In some examples, the depth of each depression 16, 16' is about 0.4 µm. The depth of each depression 16, 16' can be greater than, less than or between the values specified above.

In some instances, the diameter, or length and/or width, or other longest dimension of a particular geometry of the depression 16, 16' can be at least about 10 nm, at least about 0.1 µm, at least about 0.5 µm, at least about 1 µm, at least about 10 µm, at least about 100 µm, or more. Alternatively or additionally, the dimension can be at most about 1×10³ µm, at most about 100 µm, at most about 10 µm, at most about 1 µm, at most about 0.5 µm, at most about 0.1 µm, or less (e.g., about 50 nm). In one example, the dimension (e.g., diameter, length and/or width, or other longest dimension) of the particular depression geometry ranges from about 10 nm to about 10 µm. In some examples, the diameter of each cylindrical depression 16, 16' is about 0.4 µm. The dimension of each depression 16, 16' can be greater than, less than or between the values specified above.

In other examples, the geometry of each of the first depressions 16 is different from the geometry of each of the second depressions 16'. In other words, in these other examples, all of the depressions 16 in the active region 12 have one type of geometry and all of the depressions 16' in the bonding region 14 have a different type of geometry. In these examples, the geometry of the depressions 16 is selected from the group consisting of a cylinder, an oval cylinder, a sphere, a cube, a cuboid, a lanceoloid, a polygonal prism, and combinations thereof, and the geometry of the depressions 16' in the bonding region 14 is a different geometry selected from the same group.

In one example, the geometry of each of the first depressions 16 is cylindrical and the geometry of each of the second depressions 16' is oval cylindrical, spherical, cubed, cuboidal, lanceoloidal, polygonal, or combinations thereof. In another example, the geometry of each of the first depressions 16 is oval cylindrical and the geometry of each of the second depressions 16' is cylindrical, spherical, cubed, cuboidal, lanceoloidal, polygonal, or combinations thereof. Any of the layouts, dimensions, and/or other characteristics for these geometries may be used.

In other examples, the geometry of each of the first depressions 16 is selected from the group consisting of a cylinder, an oval cylinder, a cube, a cuboid, a cone, and a polygonal prism; and the geometry of each of the second depressions 16' includes a narrow portion $P_N$ that opens to a wide portion $P_W$. Any of the layouts, dimensions, and/or other characteristics set forth herein for the cylinder or the oval cylinder may be used for the first depressions 16 in these other examples.

FIG. 4A through FIG. 4E depict cross-sectional views of different examples of the geometries that include a narrow portion $P_N$ that opens to a wide portion $P_W$. In each of these examples, a dimension $D_1$ across an opening of the narrow portion $P_N$ is smaller than at least one dimension $D_2$ of the wide portion $P_W$ that is parallel to the dimension $D_1$ across the opening.

In any of the examples shown in FIG. 4A through FIG. 4E, it is to be understood that the adhesive 28 will fill the entire depression 16'. The wide portion $P_W$ of these examples of the depression 16' increases the surface area of the patterned substrate 10 that is available for bonding. Overhang(s) and/or slanted or curved walls that define the wide portion $P_W$ also create a cavity that can effectively trap the adhesive 28 within the depression 16'.

In the examples shown in FIG. 4A through FIG. 4D, the narrow portion $P_N$ has a geometry selected from the group consisting of a cylinder, an oval cylinder, a cube, and a cuboid; and the wide portion $P_W$ has a geometry selected from the group consisting of a cylinder, an oval cylinder, a cube, a cuboid, a lanceoloid, a sphere, a polygonal prism, and a cone.

In each of these examples, the patterned substrate 10 includes the layer 18, at least one additional layer 38 underlying the layer 18, and a base support 36 underlying the at least one additional layer 38; and for the geometry of each of the second depressions 16': the narrow portion $P_N$ is defined in and through the layer 18; the wide portion $P_W$ is defined in and through the at least one additional 38; and the base support 36 defines a bottom of the wide portion $P_W$. The additional layer(s) 38 may be any of the materials set forth herein for the layer 18 or may be any of the passivation layers set forth herein. The base support 36 may be any of the examples set forth herein.

In the example shown in FIG. 4A, the narrow portion $P_N$ has a geometry selected from the group consisting of a cylinder, an oval cylinder, a cube, and a cuboid; and the wide portion $P_W$ has a cone geometry. One example of this type of depression 16' is shown in FIG. 5 with a cylindrical narrow portion $P_N$ and a conical wide portion $P_W$.

When the narrow portion $P_N$ of the example shown in FIG. 4A is a cylinder or an oval cylinder, the dimension $D_1$ across the opening is the diameter, which may be any of the dimensions set forth herein for the depression geometries. When the narrow portion $P_N$ of the example shown in FIG. 4A is a cube or cuboid, the dimension $D_1$ across the opening is the width or height of the cube or cuboid, which may be equivalent to any of the dimensions set forth herein for the depression geometries. The depth of the narrow portion $P_N$ will depend upon the thickness of the layer 18 through which the narrow portion $P_N$ is formed.

In the example shown in FIG. 4A and FIG. 5, the narrow portion $P_N$ opens up into cone geometry that defines the wide portion $P_W$ of the depression 16'. The dimension $D_2$ of the cone geometry that is parallel to the dimension $D_1$ across the opening of the narrow portion $P_N$ increases along the depth of the wide portion $P_W$ moving from the layer 18 toward the base support 36. The dimension $D_2$ at any point along the cone geometry may range from about 10 nm to about 10 µm.

In the example geometry of FIG. 4A, the slanted walls defined in the layer 38 increase the bonding surface area and also create a cavity for the adhesive 28.

In the example shown in FIG. 4B, the narrow portion $P_N$ has a geometry selected from the group consisting of a cylinder, an oval cylinder, a cube, and a cuboid; and the wide portion $P_W$ also has a geometry selected from the group consisting of a cylinder, an oval cylinder, a cube, and a cuboid. One example of this type of depression 16' is shown in FIG. 6 with a cube shaped narrow portion $P_N$ and a cuboid (or rectangular prism) shaped wide portion $P_W$.

When the narrow portion $P_N$ of the example shown in FIG. 4B is a cylinder or an oval cylinder, the dimension $D_1$ across the opening is the diameter, which may be any of the dimensions (e.g., diameter, length, etc.) set forth herein for the depression geometries. When the narrow portion $P_N$ of the example shown in FIG. 4B is a cube or cuboid, the dimension $D_1$ across the opening is the width or height of the cube or cuboid, which may be equivalent to any of the dimensions set forth herein for the depression geometries. The depth of the narrow portion $P_N$ will depend upon the thickness of the layer 18 through which the narrow portion $P_N$ is formed.

In the example shown in FIG. 4B and FIG. 6, the narrow portion $P_N$ opens up into cylinder, oval cylinder, cube, or cuboid geometry that defines the wide portion $P_W$ of the depression 16'. The dimension $D_2$ of the cylinder, oval cylinder, cube, or cuboid geometry that is parallel to the dimension $D_1$ across the opening of the narrow portion $P_N$ is the same along the depth of the wide portion $P_W$ moving from the layer 18 toward the base support 36. The dimension $D_2$ at any point along the cylinder, oval cylinder, cube, or cuboid geometry may range from about 10 nm to about 10 µm.

In the example geometry of FIG. 4B, the layer 18 defines an overhang 42 above a portion of the wide portion $P_W$, which increases the bonding surface area and also creates a cavity for the adhesive 28.

In the example shown in FIG. 4C, the narrow portion $P_N$ has a geometry selected from the group consisting of a cylinder, an oval cylinder, a cube, and a cuboid; and the wide portion $P_W$ also has a geometry selected from the group consisting of a sphere or a lanceoloid. The overall geometry of the depression 16' shown in FIG. 4C resembles an upside down light bulb. One example of this type of depression 16' is shown in FIG. 7 with a cylindrical shaped narrow portion $P_N$ and a lanceoloid shaped wide portion $P_W$.

When the narrow portion $P_N$ of the example shown in FIG. 4C is a cylinder or an oval cylinder, the dimension $D_1$ across the opening is the diameter, which may be any of the dimensions set forth herein for the depression geometries. When the narrow portion $P_N$ of the example shown in FIG. 4C is a cube or cuboid, the dimension $D_1$ across the opening is the width or height of the cube or cuboid, which may be equivalent to any of the dimensions set forth herein for the depression geometries. The depth of the narrow portion $P_N$ will depend upon the thickness of the layer 18 through which the narrow portion $P_N$ is formed.

In the example shown in FIG. 4C and FIG. 7, the narrow portion $P_N$ opens up into the sphere or lanceoloid that defines the wide portion $P_W$ of the depression 16'. The dimension $D_1$ of the sphere or lanceoloid geometry that is parallel to the dimension $D_1$ across the opening of the narrow portion $P_N$ varies along the depth of the wide portion $P_W$ moving from the layer 18 toward the base support 36. In particular, the dimension $D_2$ gets larger and then smaller moving from the layer 18 toward the base support 36. The dimension $D_2$ at any point along the sphere or lanceoloid geometry may range from about 10 nm to about 10 µm. In this example, the sphere or lanceoloid extends through the depth of the layer 38 so that the underlying base support 36 creates the bottom surface of the depression 16'.

In the example geometry of FIG. 4C, the curved walls defined in the layer 38 increase the bonding surface area and also create a cavity for the adhesive 28.

Figure 4D:
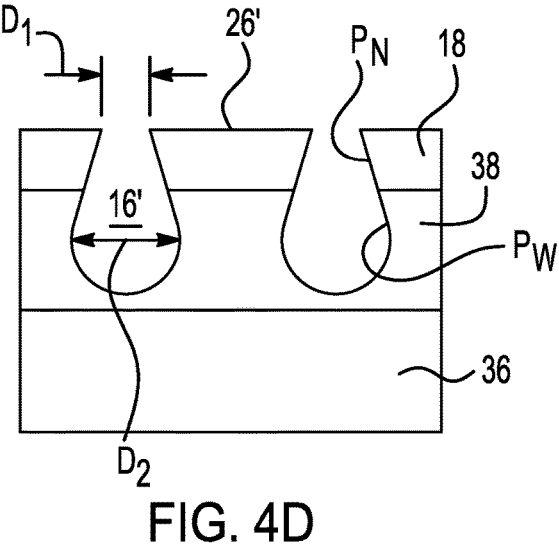

In the example shown in FIG. 4D, the narrow portion $P_N$ has a cone geometry; and the wide portion $P_W$ also has a lanceoloid geometry. The overall geometry of the depression 16' shown in FIG. 4D resembles a teardrop or raindrop.

The dimension $D_1$ across the opening of the narrow portion $P_N$ in FIG. 4D which may be any of the diameters set forth herein for the cylindrical depressions 16, 16'. In an example, the dimension $D_1$ across the opening of the narrow portion $P_N$ in FIG. 4D ranges from about 10 nm to about 10 µm. The depth of the narrow portion $P_N$ will depend upon the thickness of the layer 18 through which the narrow portion $P_N$ is formed. In this example, the dimension of the narrow portion $P_N$ increases moving from the opening to the wide portion $P_W$.

In the example shown in FIG. 4D, the narrow portion $P_N$ opens up into a lanceoloid that defines the wide portion $P_W$ of the depression 16'. The dimension $D_2$ of the lanceoloid geometry that is parallel to the dimension $D_1$ across the opening of the narrow portion $P_N$ varies along the depth of the wide portion $P_W$ moving from the layer 18 toward the base support 36. In particular, the dimension $D_2$ gets larger and then smaller moving from the layer 18 toward the base support 36. The dimension $D_2$ at any point along the lanceoloid geometry may range from about 10 nm to about 10 µm. In this example, the lanceoloid extends partially through the depth of the layer 38 so that the underlying base support 36 is not exposed. In other examples, the underlying base support 36 may form the bottom surface of the lanceoloid shaped portion of the depression 16'.

In the example geometry of FIG. 4D, the curved walls defined in the layers 18 and 38 increase the bonding surface area and also create a cavity for the adhesive 28.

Figure 4E:
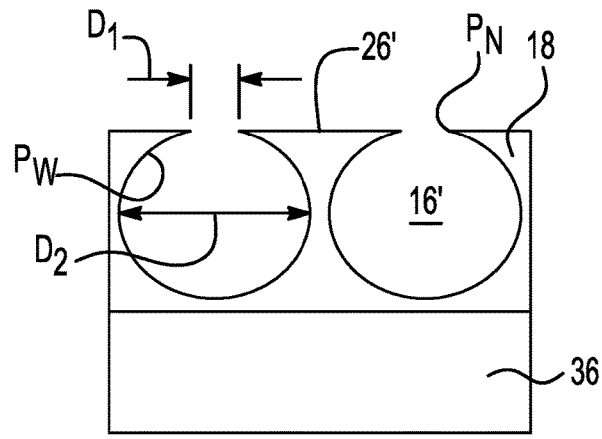

In the example shown in FIG. 4E, the depression 16' is defined in the layer 18 that is positioned over the base support 36. This geometry could also be defined in the single layer substrate or in an outermost passivation layer of a CMOS device. In this example, the depression 16' has a reentrant surface geometry, where the interior is wider than the surface entrance (the opening) but does not include a separate narrow portion $P_N$ having a depth that extends through the layer 18 like those shown and described in reference to FIG. 4A through FIG. 4D. Rather, the narrow portion $P_N$ is the opening into the wide portion $P_W$. This geometry resembles an onion underground.

The dimension $D_1$ across the opening in FIG. 4E may be any of the diameters set forth herein for the cylindrical depressions 16, 16'. The opening leads right into the sphere that defines the wide portion $P_W$ of the depression 16'. The dimension $D_2$ of the sphere geometry that is parallel to the dimension $D_1$ across the opening varies along the depth of the wide portion $P_W$ moving from the layer 18 toward the base support 36. In particular, the dimension $D_2$ gets larger and then smaller moving from the opening toward the base support 36. The dimension $D_2$ at any point along the sphere geometry may range from about 10 nm to about 10 µm. In this example, the sphere extends partially through the depth of the layer 18 so that the underlying base support 36 (or other layer) is not exposed. In other examples, the underlying base support 36 may form the bottom surface of the sphere shaped depression 16'.

In the example geometry of FIG. 4E, the curved walls defined in the layer 18 increase the bonding surface area and also create a cavity for the adhesive 28.

As illustrated in FIG. 4A through FIG. 4E and FIG. 5, FIG. 6, and FIG. 7, the interstitial regions 26' in these examples are defined by the surface of layer 18 in which the depressions 16' are at least partially defined. Thus, the interstitial regions 26' are part of a continuous surface except where the openings to the respective depressions 16' are defined.

It is to be understood that the depressions 16' having any of the geometries shown in FIG. 4A through FIG. 4E may be positioned in the bonding region(s) 14 according to any of the layouts set forth herein for the depressions 16, 16' described in reference to FIG. 2A.

Figure 4F:
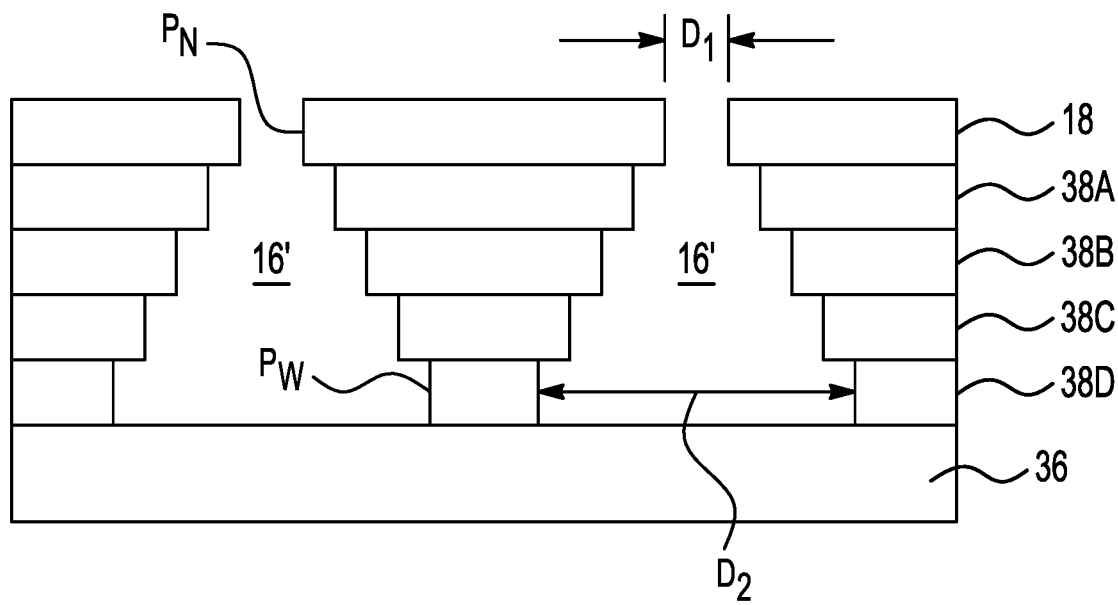
Figure 4G:
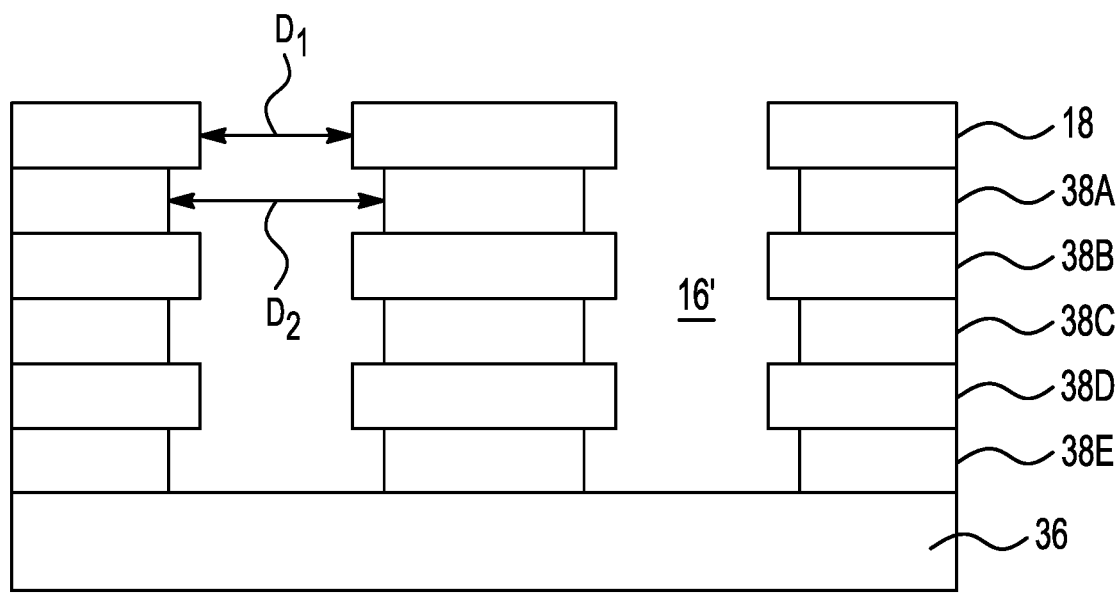

As mentioned in reference to FIG. 4A through FIG. 4D, at least one additional layer 38 underlies the layer 18, and at least a portion of the depression 16' can be defined in the at least one additional layer 38. In some examples, two or more additional layers 38 may be included. In one specific example, from 2 to 10 additional layers may be included. Examples of the depressions 16' that can be formed in a stack of layers 18, 38 are shown in FIG. 4F and FIG. 4G. The example in FIG. 4F depicts the cross-section of a cone-like geometry (with stepped sidewalls instead of smooth side walls), and the example in FIG. 4G depicts the cross-section of a cylinder-like geometry (with two different diameters $D_1$, $D_2$ along the depth as opposed to a single diameter along the depth).

In the example shown in FIG. 4F, the patterned substrate 10 includes the layer 18, a plurality of additional layers 38A-38D underlying the layer 18, and a base support 36 underlying the plurality of additional layers 38A-38D. In this example, an etch rate of the layer 18 and of each of the additional layers 38A-38D increases moving from the layer 18 toward the base support 36. As such, the etch rates of the layers 18-38D is as follows: 18<38A<38B<38C<38D. In this example, the base support 36 is non-etchable, and thus acts as an etch stop after the layer 38D adjacent to the base support 36 is etched. Due to the differing etch rates of the layer 18, 38A-38D, the slope of the depression walls may be tuned by varying the etching conditions for each layer. In the example shown in FIG. 4F, the geometry of the depression 16' increases moving from the opening defined in the layer 18 toward the base support 36.

In the example shown in FIG. 4G, the patterned substrate 10 includes the layer 18, a plurality of additional layers 38A-38E underlying the layer 18, and a base support 36 underlying the plurality of additional layers 38A-38E. In this example, the layer 18 has a first etch rate, and an etch rate of each of the additional layers 38A-38E alternates between a second etch rate and the first etch rate moving from the layer 18 toward the base support 36. In the example shown in FIG. 4G, the first etch rate is less than the second etch rate. As such, the etch rates of the layers 18-38E is as follows: 18=38B=38D<38A=38C=38E. In this example, the base support 36 is non-etchable, and thus acts as an etch stop after the layer 38E adjacent to the base support 36 is etched. In the example shown in FIG. 4G, the geometry of the depression 16' varies between a first dimension $D_1$ and a second dimension $D_2$ moving from the opening defined in the layer 18 toward the base support 36. The varying dimensions in this example create increased surface area for the adhesive 28 to grip to the side walls of the depression 16'.

In examples where different layers 18, 38 with different etch rates are used in the active region 12, 12', it is to be understood that etching to form the depressions 16 may be controlled so that the desired geometry is formed throughout the layers 18, 38. For example, to create the cylindrical geometry in the layers 18 through 38D (as shown in FIG. 4F), the etching conditions for the layers with lower etch rates (e.g., 18, 38A, 38B) may involve a longer etching time than for the layers (e.g., 38C, 38D) with higher etch rates.

In another example where the geometry of each of the first depressions 16 is different from the geometry of each of the second depressions 16', the geometry of each of the first depressions 16 is selected from the group consisting of a cylinder, an oval cylinder, a sphere, a cube, a cuboid, a cone, a lanceoloid, a polygonal prism, and combinations thereof; the geometry of each of the second depressions 16' is selected from the group consisting of a slanted cylinder, a slanted oval cylinder, a slanted cube, a slanted cuboid, and a slanted polygonal prism; and the geometry of each of the second depressions 16' has its central axis at a non-ninety degree angle relative to a plane at a bottom of the second depression 16'. In this example, the previously described cylinders, oval cylinders, cubes, cuboids, and polygonal prisms may be used (including their respective dimensions), except that they are tilted with respect to the plane upon which they are formed. Moreover, it is to be understood that each example geometry for the second depressions 16' described in reference to FIG. 4A through FIG. 4D may be slanted so that the central axis is at a non-ninety degree angle relative to a plane at a bottom of the second depression 16'.

An example of the cross-section of the slanted cylinder depressions 16' in the bonding region 14 is shown in FIG. 8.

In this example, the dimension D across the opening of each slanted cylinder depression 16' may be any of the diameters set forth herein for the cylindrical depressions 16, 16'. Similar to the cylindrical depressions 16, 16', this dimension is consistent along the depth of each slanted cylinder; but unlike the cylindrical depressions 16, 16', the central axis is not at a 90° angle with respect to a bottom of the depression 16'. As shown in FIG. 8, some of the depressions 16' in the bonding region 14 are slanted in a first direction and some other of the depressions 16' in the bonding region 14 are slanted in a second direction. As depicted, the depressions 16' slanted in the first direction have a central axis $A_1$ at an angle $\Theta_1$ that ranges from about 35° to about 85°, and the depressions 16' slanted in the second direction have a central axis $A_2$ at an angle $\Theta_2$ that ranges from about 95° to about 145°. In other examples, all of the slanted cylinder depressions 16' in the bonding region 14 may be slanted in the same direction.

In the example shown in FIG. 8, the depression 16' is defined in the layers 18, 38, for example, of a CMOS device. It is to be understood that the slanted cylinder geometry may also be defined in the layer 18 that is positioned directly over the base support 36, or in the single layer substrate, or in a stack including a plurality of additional layers 38A, 38B, etc.

Referring now to FIG. 9A through FIG. 9C, still another example of the depressions 16' in the bonding region 14 may include a feature 44 that is suspended over the depression 16' and provides an additional surface for the adhesive 28 to bond to. In this example, the patterned surface 10 further comprises a plurality of the features 44, where each feature 44 extends over a portion of a respective one of the second depressions 16' and is supported by the second interstitial region 26' surrounding the respective one of the second depressions 16', wherein the adhesive 28 wraps around each feature 44 (as shown in FIG. 9B and FIG. 9C).

As depicted in the top view in FIG. 9A, the bonding region 14 includes the depressions 16', which in this example are cylindrical or oval cylindrical, and the features 44 suspended over a portion of each depression 16'. The interstitial region 26' surrounding each depression 16' provides support for the individual features 44. The geometry of each feature 44 is such that it does not cover the depression opening and does not extend into the entire depth of the depression 16'. Thus, each feature 44 only partially covers the depression opening (thus allowing the adhesive 28 to enter into the depression 16') and only extends partially into the depth of depression 16' (thus allowing the adhesive 28 to reach the bottom of each depression 16' and wrap around the bottom of the feature 44). In the example shown, the feature 44 is a beam whose diameter is less than the diameter of the depression 16' and that has a rounded portion that extends partially into the depth of the depression 16'.

In the example shown in FIG. 9A through FIG. 9C, the depression 16' is defined in the layer 18 that is positioned over the base support 36, and the feature 44 is supported by the layer 18. It is to be understood, however, that the feature 44 may be integrated into cylindrical or oval cylindrical depressions 16' that are formed in the layers 18, 38 of a CMOS device or that are formed in the single layer substrate.

In other examples, the features 44 are formed in the layer(s) 18, 38. In these examples, the layer(s) 18, 38 are continuous, except where the second depressions 16' are formed.

In each example of the patterned structure 10 that includes depressions 16' in the bonding region 14, it is to be understood that the adhesive 28 fills the depressions 16' and is present on the interstitial regions 26' in the bonding region 14.

Referring now to FIG. 2B, another example of the active region 12' and the bonding region 14' include the posts 34, 34'.

In some examples (as shown in FIG. 2B), the geometry of each of the first posts 34 and of each of the second posts 34' is the same. In other words, in these examples, all of the posts 34, 34' have the same geometry. In these examples, the geometry of the posts 34, 34' is selected from the group consisting of a cylinder, an oval cylinder, a cube, a cuboid, a cone, a polygonal prism, and combinations thereof. A perspective view of the cylindrical posts 34, 34' is shown in FIG. 10A and a perspective view of the oval cylindrical posts 34, 34' is shown in FIG. 10B. Other post 34, 34' geometries are shown and described in reference to FIG. 11 through FIG. 14B.

Each post 34, 34' is a three-dimensional structure that extends outward from the surface of the layer 18 (or other layer, e.g., layer(s) 38, or the base support 36). Thus, the posts 34, 34' are convex regions with respect to the interstitial regions 26, 26' of the layer 18 or 38 or base support 36 that respectively surround the posts 34, 34'.

The layout or pattern of the post 34 in the active region 12' may be the same as or different than the layout or pattern of the posts 34' in the bonding region 14'. The respective layouts may be regular, repeating, or non-regular patterns. In an example, the posts 34, 34' in the active and bonding regions 12', 14' are disposed in a hexagonal grid for close packing and improved density. Other layouts may include, for example, rectangular layouts, triangular layouts, and so forth. In some examples, the layout or pattern can be an x-y format of posts 34 or 34' that are in rows and columns and are separated by the interstitial regions 26 or 26'. The posts 34 or 34' may be aligned in other patterns, such as stripes, swirls, lines, triangles, rectangles, circles, arcs, checks, diagonals, arrows, and/or squares.

The layout or pattern of the posts 34 or 34' may be characterized with respect to the density of the respective posts 34, 34' (e.g., number of posts 34, 34') in the active region 12' and bonding region 14'. For example, the posts 34 and/or 34' may be present at a density of approximately 2 million per $mm^2$. The density may be tuned to different densities including, for example, a density of about 100 per $mm^2$, about 1,000 per $mm^2$, about 0.1 million per $mm^2$, about 1 million per $mm^2$, about 2 million per $mm^2$, about 5 million per $mm^2$, about 10 million per $mm^2$, about 50 million per $mm^2$, or more, or less. It is to be further understood that the density of the posts 34 or 34' can be between one of the lower values and one of the upper values selected from the ranges above. As examples, a high density array may be characterized as having posts 34 or 34' separated by less than about 100 nm, a medium density array may be characterized as having posts 34 or 34' separated by about 400 nm to about 1 µm, and a low density array may be characterized as having posts 34 or 34' separated by greater than about 1 µm. While example densities have been provided, it is to be understood that any suitable densities may be used. In some instances, it may be desirable for the spacing between posts 34 or 34' to be even greater than the examples listed herein.

The layout or pattern of the posts 34 or 34' may also or alternatively be characterized in terms of the average pitch, or the spacing from the center of one post 34 or 34' to the center of an adjacent post 34 or 34' (center-to-center spacing) or from the left edge of one post 34 or 34' to the right edge of an adjacent post 34 or 34' (edge-to-edge spacing). The pattern can be regular, such that the coefficient of variation around the average pitch is small, or the pattern can be non-regular in which case the coefficient of variation can be relatively large. In either case, the average pitch can be, for example, about 50 nm, about 0.1 µm, about 0.5 µm, about 1 µm, about 5 µm, about 10 µm, about 100 µm, or more or less. The average pitch for a particular pattern of posts 34 or 34' can be between one of the lower values and one of the upper values selected from the ranges above. While example average pitch values have been provided, it is to be understood that other average pitch values may be used.

The size of each post 34 or 34' may be characterized by its top surface area, height, and/or diameter (if circular or oval in shape) or length and width. The top surface of the posts 34 or 34' may have a surface area ranging from about $1 \times 10^{-3}$ µm$^2$ to about 100 µm$^2$, e.g., about $1 \times 10^{-2}$ µm$^2$, about 0.1 µm$^2$, about 1 µm$^2$, at least about 10 µm$^2$, or more, or less. The height of the posts 34 or 34' can range from about 0.1 µm to about 100 µm, e.g., about 0.5 µm, about 1 µm, about 10 µm, or more, or less. For yet another example, the diameter or each of the length and width of the posts 34 or 34' can range from about 10 nm to about 100 µm, e.g., about 0.5 µm, about 1 µm, about 10 µm, or more, or less.

In other examples, the geometry of each of the first posts 34 is different from the geometry of each of the second posts 34'. In other words, in these other examples, all of the posts 34 in the active region 12' have one type of geometry and all of the posts 34' in the bonding region 14' have a different type of geometry. In these examples, the geometry of the posts 34 in the active region 12' is selected from the group consisting of a cylinder, an oval cylinder, a cube, a cuboid, a cone, and a polygonal prism, and the geometry of the posts 34' in the bonding region 14' is a different geometry selected from the same group.

In one example, the geometry of each of the first posts 34 is cylindrical and the geometry of each of the second posts 34' is oval cylindrical. In another example, the geometry of each of the first posts 34 is oval cylindrical and the geometry of each of the second posts 34' is cylindrical. Any of the layouts, dimensions, and/or other characteristics for these geometries may be used.

Other examples of suitable geometries for the posts 34' in the bonding region 14' are shown in FIG. 11 and FIG. 12. In these examples, the geometry of each of the second posts 34' includes a narrow portion $P_{N2}$ that extends out to a wide portion $P_{W2}$; and for the geometry of each of these second posts 34', a dimension $D_3$ across a base of the narrow portion $P_{N2}$ is smaller than at least one dimension $D_4$ of the wide portion $P_{W2}$ that is parallel to the dimension $D_3$ across the base.

In the examples shown in FIG. 11 and FIG. 12, it is to be understood that the adhesive 28 will fill the space that overlies the interstitial region 26' and that surrounds the posts 34' and will extend over the posts 34' (similar to the adhesive 28 shown in FIG. 2B). The wide portion $P_{W2}$ of these examples of the posts 34' increases the surface area of the patterned substrate 10' in the binding region 14' that is available for bonding.

In the examples shown in FIG. 11 and FIG. 12, the narrow portion $P_{N2}$ has a geometry selected from the group consisting of a cylinder, an oval cylinder, a cube, a cuboid, and a cone; and the wide portion $P_{W2}$ has a geometry selected from the group consisting of a cylinder, an oval cylinder, a cube, and a cuboid.

In each of these examples, the patterned substrate 10' includes the layer 18, at least one additional layer 38 underlying the layer 18, and a base support 36 underlying the at least one additional layer 38; and for the geometry of each of the second posts 34': the wide portion $P_{W2}$ is defined in the layer 18; and the narrow portion $P_{N2}$ is defined in the at least one additional layer 38. The two (or more) layers 18, 38 may be supported by the base support 36. These additional layers 38 may be any of the materials set forth herein for the layer 18 or may be any of the passivation layers set forth herein.

In the example shown in FIG. 11, the wide portion $P_{W2}$ has a cylinder geometry and the narrow portion $P_{N2}$ has a cone geometry. The dimension $D_4$ of the cylinder that defines the wide portion $P_{W2}$ may be any of the diameters set forth herein for the cylindrical or oval cylindrical depressions 16, 16'. The largest dimension of the narrow portion $P_{N2}$ is adjacent the wide portion $P_{W2}$, and the dimensions of the cone decrease along the height of the post 34' moving from the layer 18 toward the base support 36. As such, the smallest dimension $D_3$ of the post 34' is at the base of the cone geometry, and is smaller than the dimension $D_4$. The height of the post 34' shown in FIG. 11 may be any of the dimensions set forth herein for the depth of the depressions 16, 16'.

In the example shown in FIG. 12, both the wide portion $P_{W2}$ and the narrow portion $P_{N2}$ have respective cuboid geometries, although the wide portion $P_{W2}$ could alternatively be a cube or an oval cylinder and the narrow portion $P_{N2}$ could alternatively be a cylinder, an oval cylinder, or a cube. The dimension $D_4$ of the cuboid (or other geometry) that defines the wide portion $P_{W2}$ may be any of the dimension set forth herein for the depression geometries. The dimension $D_3$ of the cuboid (or other geometry) that defines the narrow portion $P_{N2}$ is smaller than the dimension $D_4$. The height of the post 34' shown in FIG. 12 may be any of the dimensions set forth herein for the depth of the depressions 16, 16'.

In another example where the geometry of each of the first posts 34 is different from the geometry of each of the second posts 34', the geometry of each of the first posts 34 is selected from the group consisting of a cylinder, an oval cylinder, a sphere, a cube, a cuboid, a cone, a lanceoloid, a polygonal prism, and combinations thereof; the geometry of each of the second posts 34' selected from the group consisting of a slanted cylinder, a slanted oval cylinder, a slanted cube, a slanted cuboid, and a slanted polygonal prism; and each of the second posts 34' has its central axis at a non-ninety degree angle relative to a plane at a bottom of the second post 34'. A perspective view of the slanted cylinder post 34' is shown in FIG. 13.

In this example, the dimension D across the top surface of the slanted cylinder post 34' may be any of the diameters set forth herein for the cylindrical depressions 16, 16'. Similar to the cylindrical depressions 16, 16', this dimension is consistent along the height of each slanted cylinder post 34'; but unlike the cylindrical depressions 16, 16', the central axis A of the post 34' is not at a 90° angle with respect to a plane upon which the post 34' is formed. In an example, the central axis A is at an angle Θ that either ranges from about 35° to about 85° or from about 95° to about 145° with respect to a plane upon which the post 34' is formed.

When the bonding region 14' includes a plurality of slanted cylindrical posts 34' (or other slanted geometries), the posts 34' may be slanted in the same direction, or some of the posts 34' may slanted in a first direction while some other of the posts 34' may be slanted in a second direction (similar to the slanted cylindrical depressions shown in FIG. 8).

In the example shown in FIG. 13, the post 34' is defined in the layer 18 that is positioned over the base support 36. Alternatively, the posts 34' may be formed in a stack of layers 18, 38, e.g., such as those of a CMOS device, or in the single layer substrate.

As mentioned in reference to FIG. 11 and FIG. 12, at least one additional layer 38 underlies the layer 18, and at least a portion of the post 34' can be defined in the at least one additional layer 38. In some examples, two or more additional layers 38 may be included. In one specific example, from 2 to 10 additional layers may be included. Examples of the posts 34' that can be formed in a stack of layers 18, 38 are shown in FIG. 14A and FIG. 14B. The example in FIG. 14A depicts the cross-section of a cone-like geometry (an inverted cone with stepped sidewalls instead of smooth side walls), and the example in FIG. 14B depicts the cross-section of a cylinder-like geometry (with two different diameters along the depth as opposed to a single diameter along the depth).

In the example shown in FIG. 14A, the patterned substrate 10' includes the layer 18, a plurality of additional layers 38A-38C underlying the layer 18, and a base support 36 underlying the plurality of additional layers 38A-38C. In this example, an etch rate of the layer 18 and of each of the additional layers 38A-38C increases moving from the layer 18 toward the base support 36. As such, the etch rates of the layers 18-38C is as follows: 18<38A<38B<38C. In this example, the base support 36 is non-etchable, and thus acts as an etch stop after the layer 38C adjacent to the base support 36 is etched. Due to the differing etch rates of the layer 18, 38A-38C, the slope of the post walls may be tuned by varying the etching conditions for each layer. In the example shown in FIG. 14A, the geometry of the post 34' decreases moving from the layer 18 toward the base support 36.

In the example shown in FIG. 14B, the patterned substrate 10' includes the layer 18, a plurality of additional layers 38A-38C underlying the layer 18, and a base support 36 underlying the plurality of additional layers 38A-38C. In this example, the layer 18 has a first etch rate, and an etch rate of each of the additional layers 38A-38C alternates between a second etch rate and the first etch rate moving from the layer 18 toward the base support 36. In the example shown in FIG. 14B, the first etch rate is less than the second etch rate. As such, the etch rates of the layers 18-38C is as follows: 18=38B<38A=38C. In this example, the base support 36 is non-etchable, and thus acts as an etch stop after the layer 38C adjacent to the base support 36 is etched. In the example shown in FIG. 14B, the geometry of the 34' varies between a first dimension $D_1$ and a second dimension $D_2$ moving from the layer 18 toward the base support 36.

While a single post 34' is shown in each of FIG. 11, FIG. 12, and FIG. 13, and two posts 34' are shown in FIG. 14A and FIG. 14B, it is to be understood that an array of posts 34' may be formed in the bonding region 14'. In the example geometries of FIG. 11 through FIG. 13, the slanted walls or the overhang 42 created by the posts 34' increase the bonding surface area for the adhesive 28. In the example geometries of FIG. 14A and FIG. 14B, the varying dimensions create increased surface area for the adhesive 28 to grip to the side walls of the posts 34'.

In any of the examples disclosed herein that include one or more additional layers 38 between the layer 18 and the base support 36, the depressions 16 or posts 34 within the active regions 12, 12' may be defined in the outermost layer 18 alone, or in the outermost layer 18 and any number of the additional layer(s) 38, depending upon the desired depth for the depressions 16 or the desired height for the posts 34.

Referring more generally to FIG. 2A through FIG. 2D, each example of the flow cell 20A, 20B, 20C, 20D includes the surface chemistry in the depressions 16 or on the posts 34 in the active region 12, 12'. The surface chemistry includes the polymeric hydrogel 22 and the primers 24A, 24B.

The polymeric hydrogel 22 may be any gel material that can swell when liquid is taken up and can contract when liquid is removed, e.g., by drying. In an example, the polymeric hydrogel 22 includes an acrylamide copolymer. Some examples of the acrylamide copolymer are represented by the following structure (I):

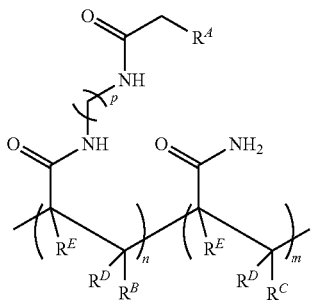

wherein:
$R^A$ is selected from the group consisting of azido, optionally substituted amino, optionally substituted alkenyl, optionally substituted alkyne, halogen, optionally substituted hydrazone, optionally substituted hydrazine, carboxyl, hydroxy, optionally substituted tetrazole, optionally substituted tetrazine, nitrile oxide, nitrone, sulfate, and thiol;

$R^B$ is H or optionally substituted alkyl;

$R^C$, $R^D$, and $R^E$ are each independently selected from the group consisting of H and optionally substituted alkyl;

each of the $—(CH_2)_p—$ can be optionally substituted;

p is an integer in the range of 1 to 50;

n is an integer in the range of 1 to 50,000; and m is an integer in the range of 1 to 100,000.

One specific example of the acrylamide copolymer represented by structure (I) is poly(N-(5-azidoacetamidylpentyl)acrylamide-co-acrylamide, PAZAM.

One of ordinary skill in the art will recognize that the arrangement of the recurring "n" and "m" features in structure (I) are representative, and the monomeric subunits may be present in any order in the polymer structure (e.g., random, block, patterned, or a combination thereof).

The molecular weight of the acrylamide copolymer may range from about 5 kDa to about 1500 kDa or from about 10 kDa to about 1000 kDa, or may be, in a specific example, about 312 kDa.

In some examples, the acrylamide copolymer is a linear polymer. In some other examples, the acrylamide copolymer is a lightly cross-linked polymer.

In other examples, the gel material may be a variation of structure (I). In one example, the acrylamide unit may be replaced with N,N-dimethylacrylamide

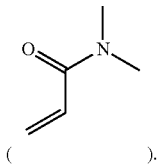

( ).

In this example, the acrylamide unit in structure (I) may be replaced with,

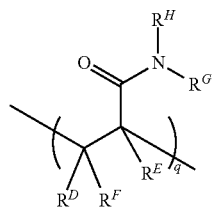

where $R^D$, $R^E$, and $R^F$ are each H or a C1-C6 alkyl, and $R^G$ and $R^H$ are each a C1-C6 alkyl (instead of H as is the case with the acrylamide). In this example, q may be an integer in the range of 1 to 100,000. In another example, the N,N-dimethylacrylamide may be used in addition to the acrylamide unit. In this example, structure (I) may include

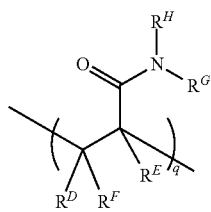

in addition to the recurring "n" and "m" features, where RD, RE, and RF are each H or a C1-C6 alkyl, and $R^G$ and $R^H$ are each a C1-C6 alkyl. In this example, q may be an integer in the range of 1 to 100,000.

As another example of the polymeric hydrogel 22, the recurring "n" feature in structure (I) may be replaced with a monomer including a heterocyclic azido group having structure (II):

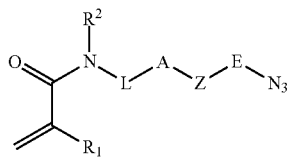

wherein $R_1$ is H or a C1-C6 alkyl; $R^2$ is H or a C1-C6 alkyl; L is a linker including a linear chain with 2 to 20 atoms selected from the group consisting of carbon, oxygen, and nitrogen and 10 optional substituents on the carbon and any nitrogen atoms in the chain; E is a linear chain including 1 to 4 atoms selected from the group consisting of carbon, oxygen and nitrogen, and optional substituents on the carbon and any nitrogen atoms in the chain; A is an N substituted amide with an H or a C1-C4 alkyl attached to the N; and Z is a nitrogen containing heterocycle. Examples of Z include 5 to 10 carbon-containing ring members present as a single cyclic structure or a fused structure. Some specific examples of Z include pyrrolidinyl, pyridinyl, or pyrimidinyl.

As still another example, the gel material may include a recurring unit of each of structure (III) and (IV):

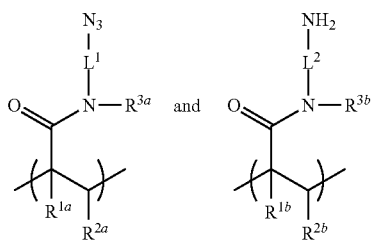

wherein each of $R^{1a}$, $R^{2a}$, $R^{1b}$ and $R^{2b}$ is independently selected from hydrogen, an optionally substituted alkyl or optionally substituted phenyl; each of $R^{3a}$ and $R^{3b}$ is independently selected from hydrogen, an optionally substituted alkyl, an optionally substituted phenyl, or an optionally substituted C7-C14 aralkyl; and each $L^1$ and $L^2$ is independently selected from an optionally substituted alkylene linker or an optionally substituted heteroalkylene linker.

In still another example, the acrylamide copolymer is formed using nitroxide mediated polymerization, and thus at least some of the copolymer chains have an alkoxyamine end group. In the copolymer chain, the term "alkoxyamine end group" refers to the dormant species —$ONR_1R_2$, where each of $R_1$ and $R_2$ may be the same or different, and may independently be a linear or branched alkyl, or a ring structure, and where the oxygen atom is attached to the rest of the copolymer chain. In some examples, the alkoxyamine may also be introduced into some of the recurring acrylamide monomers, e.g., at position $R^4$ in structure (I). As such, in one example, structure (I) includes an alkoxyamine end group; and in another example, structure (I) includes an alkoxyamine end group and alkoxyamine groups in at least some of the side chains.

It is to be understood that other molecules may be used to form the polymeric hydrogel 22, as long as they are capable of being functionalized with the desired chemistry, e.g., the single primer set. Some examples of suitable materials for the polymeric hydrogel 22 include functionalized silanes, such as norbornene silane, azido silane, alkyne functionalized silane, amine functionalized silane, maleimide silane, or any other silane having functional groups that can respectively attach the desired chemistry. Still other examples of suitable materials for polymeric hydrogel 22 include those having a colloidal structure, such as agarose; or a polymer mesh structure, such as gelatin; or a cross-linked polymer structure, such as polyacrylamide polymers and copolymers, silane free acrylamide (SFA), or an azidolyzed version of SFA. Examples of suitable polyacrylamide polymers may be synthesized from acrylamide and an acrylic acid or an acrylic acid containing a vinyl group, or from monomers that form [2+2] photo-cycloaddition reactions. Still other examples of suitable materials for the polymeric hydrogel 22 include mixed copolymers of acrylamides and acrylates. A variety of polymer architectures containing acrylic monomers (e.g., acrylamides, acrylates etc.) may be utilized in the examples disclosed herein, such as branched polymers, including dendrimers (e.g., multi-arm or star polymers), star-shaped or star-block polymers, and the like. For example, the monomers (e.g., acrylamide, acrylamide containing the catalyst, etc.) may be incorporated, either randomly or in block, into the branches (arms) of a dendrimer.

The gel material for the polymeric hydrogel 22 may be formed using any suitable copolymerization process, such as nitroxide mediated polymerization (NMP), reversible addition-fragmentation chain-transfer (RAFT) polymerization, etc.

The attachment of the polymeric hydrogel 22 to the underlying layer 18 may be through covalent bonding. In some instances, the underlying layer 18 may first be activated, e.g., through silanization or plasma ashing. Covalent linking is helpful for maintaining the primers in the desired regions throughout the lifetime of the flow cell during a variety of uses.

The primers 24A, 24B make up a primer set that is used in sequential paired end sequencing. In sequential paired end sequencing, the respective forward strands that are generated are sequenced and removed, and then the respective reverse strands are generated, sequenced, and removed.

As examples, the primer set may include P5 and P7 primers, P15 and P7 primers, or any combination of the PA primers, the PB primers, the PC primers, and the PD primers set forth herein. As example combinations, the primer set may include any two PA, PB, PC, or PD primers, or any combination of one PA primer and one PB, PC, or PD primer, or any combination of one PB primer and one PC or PD primer, or any combination of one PC primer and one PD primer.

Examples of P5 and P7 primers are used on the surface of commercial flow cells sold by Illumina Inc. for sequencing, for example, on HISEQ™, HISEQX™, MISEQ™, MISEQDX™, MINISEQ™, NEXTSEQ™, NEXTSEQDX™, NOVASEQ™, ISEQ™, GENOME ANALYZER™, and other instrument platforms.

The P5 primer is:

P5: 5' → 3'
(SEQ. ID. NO. 1)
AATGATACGGCGACCACCGAGAUCTACAC

The P7 primer may be any of the following:

P7 #1: 5' → 3'
(SEQ. ID. NO. 2)
CAAGCAGAAGACGGCATACGAnAT

P7 #2: 5' → 3'
(SEQ. ID. NO. 3)
CAAGCAGAAGACGGCATACnAGAT

P7 #3: 5' → 3'
(SEQ. ID. NO. 4)
CAAGCAGAAGACGGCATACnAnAT where "n" is 8-oxoguanine in each of these sequences.
The P15 primer is:

P15: 5' → 3'
(SEQ. ID. NO. 5)
AATGATACGGCGACCACCGAGAnCTACAC where "n" is allyl-T (a thymine nucleotide analog having an allyl functionality).
The other primers (PA-PD) mentioned above include:

PA 5' → 3'
(SEQ. ID. NO. 6)
GCTGGCACGTCCGAACGCTTCGTTAATCCGTTGAG

CPA (PA') 5' → 3'
(SEQ. ID. NO. 7)
CTCAACGGATTAACGAAGCGTTCGGACGTGCCAGC

PB 5' → 3'
(SEQ. ID. NO. 8)
CGTCGTCTGCCATGGCGCTTCGGTGGATATGAACT cPB (PB') 5' → 3'
(SEQ. ID. NO. 9)
AGTTCATATCCACCGAAGCGCCATGGCAGACGACG

PC 5' → 3'
(SEQ. ID. NO. 10)
ACGGCCGCTAATATCAACGCGTCGAATCCGCAACT cPC (PC') 5' → 3'
(SEQ. ID. NO. 11)
AGTTGCGGATTCGACGCGTTGATATTAGCGGCCGT

PD 5' → 3'
(SEQ. ID. NO. 12)
GCCGCGTTACGTTAGCCGGACTATTCGATGCAGC cPD (PD') 5' → 3'
(SEQ. ID. NO. 13)
GCTGCATCGAATAGTCCGGCTAACGTAACGCGGC.

While not shown in the example sequences for PA-PD, it is to be understood that any of these primers may include a cleavage site, such as uracil, 8-oxoguanine, allyl-T, etc. at any point in the strand, as long as the cleavage sites of the primers 24A and 24B are orthogonal (i.e., the cleaving chemistry of the primer 24A is different than the cleaving chemistry for the primer 24B, and thus the two primers 24A, 24B are susceptible to different cleaving agents).

Each of the primers 24A, 24B disclosed herein may also include a polyT sequence at the 5' end of the primer sequence. In some examples, the polyT region includes from 2 T bases to 20 T bases. As specific examples, the polyT region may include 3, 4, 5, 6, 7, or 10 T bases.

The 5' terminal end of the primers 24A, 24B will vary depending upon the chemistry of the polymeric hydrogel 22. As two examples, the 5' end functional groups may be a terminal alkyne (e.g., hexynyl) or an internal alkyne, where the alkyne is part of a cyclic compound (e.g., bicyclo[6.1.0] nonyne (BCN)). The terminal alkynes can attach to azide groups on the polymeric hydrogel 22. In another example, the primers 24A, 24B may include an alkene at the 5' terminus, which can react with reactive thiol groups on the polymeric hydrogel 22. In still other specific examples, succinimidyl (NHS) ester terminated primers may be reacted with amine groups on the polymeric hydrogel 22, aldehyde terminated primers may be reacted with hydrazine groups on the polymeric hydrogel 22, azide terminated primers may be reacted with an alkyne or DBCO (dibenzocyclooctyne) on the polymeric hydrogel 22, or amino terminated primers may be reacted with activated carboxylate groups on the polymeric hydrogel 22.

Each example of the flow cell 20A, 20B, 20C, 20D also includes the adhesive 28 in the bonding region 14, 14'. Examples of suitable adhesives 28 include pressure sensitive adhesives and reactive-hardening adhesives.

Examples of pressure sensitive adhesives include the following amorphous polymer chemistries: natural rubber (polyisoprene), styrene block copolymer (such as styrene-isoprene block copolymers (SIS) or styrene-butadiene-styrene block copolymers (SBS)), styrene-butadiene random copolymers, polybutadiene, polyisobutylene, acrylic, silicone, polyvinylether, or thermoplastic elastomers. These formulations may include tackifier, plasticizer, or crosslinking additives to impart tacticity to the adhesive. The amorphous polymer film in a pressure sensitive adhesive may be unsupported (often referred to as a "transfer tape") or supported by a carrier film, such as polyester, polyurethane, polyethylene, polypropylene, nonwoven fiber, or metal foil. When a carrier film is used, the pressure sensitive adhesive may be coated on one side of the carrier film (single-coat) or both sides of the carrier film (double-coat).

Reactive-hardening adhesives may be of two categories: 1-component formulations or 2-component formulations. 1-component formulations may be composed of the following chemistries: epoxy, phenolic, polyurethane, polyimide, or polyvinyl-phenolic copolymers. Reactions within 1-component adhesive formulas may be triggered by the following mechanisms: moisture, thermal heat, or ultraviolet light. Dimethacrylate adhesives are a separate type of 1-component adhesive that may be used. This particular example cures onto reactive metal surfaces in the absence of air. 2-component adhesive formulations crosslink and harden during mixture of 2 functionalized monomers, and may be of the following chemistries: epoxy, phenolic, polyurethane, polyimide, polyvinyl-phenolic, or acrylic.

In some examples, the adhesive 28 may be selected so that its surface energy matches the surface energy of the surface to which it is bonding (e.g., the layer(s) 18, 38, 36). The materials may be selected to match, or one or both of the adhesive 28 and the layer(s) 18, 38 and/or the base support 36 may be modified, e.g., via a surface treatment, a surface coating, or by the addition of additives, in order to achieve the desired surface energy. Examples of suitable surface treatments include reactive plasma ashing, corona discharge plasma, solvent cleaning, or anodization.

In the bonding region 14, the adhesive 28 fills the depressions 16' and covers the interstitial regions 26'. The sidewalls of the depressions 16' increase the bonding surface area in the region 14. In the bonding region 14', the adhesive 28 fills the space adjacent to the interstitial regions 26' that surround the posts 34' and extends over the posts 34'. The sidewalls of the posts 34' increase the bonding surface area in the region 14'.

Each of the flow cells 20A, 20B, 20C, and 20D also includes a cover 30 that is attached to the patterned substrate 10 through the adhesive 28. The flow cells 20A, 20B of FIG. 2A and FIG. 2B illustrate a lid 46 as the cover 30. The flow cell 20C of FIG. 2C illustrates a partially patterned substrate 48 as the cover 30. The flow cell 20D of FIG. 2D illustrates another patterned substrate 10" as the cover 30.

As mentioned, the lid 46 is the cover 30 of the flow cells 20A, 20B shown in FIG. 2A and FIG. 2B. The lid 46 may be any material that is transparent to the excitation light that is directed toward the active regions 12, 12'. In some optical detection systems, the lid 46 may also be transparent to the emissions generated from reaction(s) taking place in the active regions 12, 12'. As examples, the lid 46 may include glass (e.g., borosilicate, fused silica, etc.) or a transparent polymer. A commercially available example of a suitable borosilicate glass is D 263®, available from Schott North America Inc. Commercially available examples of suitable polymer materials, namely cycloolefin polymers, are the ZEONOR® products available from Zeon Chemicals L.P.

The lid 46 is physically connected to the patterned substrate 10 through the adhesive 28 at the bonding regions 14, 14'. In an example, the lid 46 may be a block of material having the same length and width as the patterned substrate 10. The lid 46 may have a planar exterior surface and recesses 51 defined in the inner surface (i.e., the surface that is to be adhered to the patterned substrate 10). The recesses 51 may be etched into, or otherwise defined in the transparent block and may have dimensions that correspond with the dimensions of the active regions 12, 12'. Thus, when the lid 46 is mounted to the patterned substrate 10, the recesses 51 respectively align with the active regions 12, 12' and respectively and partially define the flow channels 32.

While not shown, the lid 46 may include respective inlet and outlet ports that are configured to fluidically engage other ports (not shown) for directing fluid(s) into the respective flow channels 32 (e.g., from a reagent cartridge or other fluid storage system component) and out of the respective flow channels 32 (e.g., to a waste removal system).

Referring now to FIG. 2C, the partially patterned substrate 48 is the cover 30 of the flow cell 20C. The partially patterned substrate 48 may be any material that is transparent to the excitation light that is directed toward the active regions 12, 12'. In some optical detection systems, the partially patterned substrate 48 may also be to the emissions generated from reaction(s) taking place in the active regions 12, 12'. Any examples of the lid 46 or the base support 36 may be used for the partially patterned substrate 48 as long as the material exhibits the desired transparency.

The partially patterned substrate 48 is physically connected to the patterned substrate 10 through the adhesive 28 at the bonding regions 14, 14'. In an example, the partially patterned substrate 48 may be a block of material having the same length and width as the patterned substrate 10. The partially patterned substrate 48 may have planar exterior and interior surfaces, and depressions 16" defined in the inner surface at areas that align with the bonding regions 14, 14'. These depressions 16" may have any of the geometries disclosed herein for the depressions 16', and thus may increase the adhesion between the substrates 10, 48. In the example shown in FIG. 2C, the adhesive 28 defines sidewalls of the flow channels 32 that are defined between respective active regions 12, 12' and the partially patterned substrate 48.

In another example (not shown), the partially patterned substrate 48 may also include recesses 51 defined in the interior surface, which are similar to those described in reference to FIG. 2A and FIG. 2B. These recesses 51 would align with the active regions 12, 12' of the patterned substrate 10 to partially define the flow channels 32.

While not shown in FIG. 2C, the partially patterned substrate 48 may include respective inlet and outlet ports that are configured to fluidically engage other ports (not shown) for directing fluid(s) into the respective flow channels 32 (e.g., from a reagent cartridge or other fluid storage system component) and out of the respective flow channels 32 (e.g., to a waste removal system).

Referring now to FIG. 2D, another patterned substrate 10" is used as the cover 30 of the flow cell 20D. The patterned structure 10" may be any example of the patterned substrate 10 or the patterned substrate 10' with depressions 16, 16' or posts 34, 34' defined in the active and bonding regions 12, 14 or 12', 14'. The two patterned substrates 10 or 10' and 10" are aligned so that the bonding regions 14, 14' are adhered together via the adhesive 28 and so that the active regions 12, 12' are aligned.

While not shown in FIG. 2D, patterned substrate 10 or 10" may include respective inlet and outlet ports that are configured to fluidically engage other ports (not shown) for directing fluid(s) into the respective flow channels 32 (e.g., from a reagent cartridge or other fluid storage system component) and out of the respective flow channels 32 (e.g., to a waste removal system).

As mentioned, some examples of the flow cell 20A, 20B, 20C, 20D are integrated with an electronic detection device, such as a complementary metal oxide semiconductor chip 50, an example of which is shown in FIG. 15.

In the illustrated example, the patterned substrate 10 may be affixed directly to, and thus be in physical contact with, the complementary metal oxide semiconductor chip 50 through one or more securing mechanisms (e.g., adhesive, bond, fasteners, and the like). It is to be understood that the patterned substrate 10 may be removably coupled to the complementary metal oxide semiconductor (CMOS) chip 50.

The CMOS chip 50 includes a plurality of stacked layers 52 including, for example, silicon layer(s), dielectric layer(s), metal-dielectric layer(s), metal layer(s), etc.). The stacked layers 52 make up the device circuitry, which includes detection circuitry.

The CMOS chip 50 includes optical components, such as optical sensor(s) 54 and optical waveguide(s) 56. The optical components are arranged such that each optical sensor 54 at least substantially aligns with, and thus is operatively associated with, a single optical waveguide 56 and a single reaction site (i.e., a depression 16 with surface chemistry therein or a post 34 with surface chemistry thereon) of the patterned substrate 10, 10'. However, in other examples, a single optical sensor 54 may receive photons through more than one optical waveguide 56 and/or from more than one reaction site. In these other examples, the single optical sensor 54 is operatively associated with more than one optical waveguide 56 and/or more than one reaction site.

As used herein, a single optical sensor 54 may be a light sensor that includes one pixel or more than one pixel. As an example, each optical sensor 54 may have a detection area that is less than about 50 µm². As another example, the detection area may be less than about 10 µm². As still another example, the detection area may be less than about 2 µm². In the latter example, the optical sensor 54 may constitute a single pixel. An average read noise of each pixel the optical sensor 54 may be, for example, less than about 150 electrons. In other examples, the read noise may be less than about 5 electrons. The resolution of the optical sensor(s) 54 may be greater than about 0.5 megapixels (Mpixels). In other examples, the resolution may be greater than about 5 Mpixels, or greater than about 10 Mpixels.

Also as used herein, a single optical waveguide 56 may be a light guide including a cured filter material that i) filters the excitation light 58 (propagating from an exterior of the flow cell into the flow channel 32), and ii) permits the light emissions (not shown, resulting from reactions at the reaction site) to propagate therethrough toward corresponding optical sensor(s) 54. In an example, the optical waveguide 56 may be, for example, an organic absorption filter. As a specific example, the organic absorption filter may filter excitation light 58 of about 532 nm wavelength and permit light emissions of about 570 nm or more wavelengths. The optical waveguide 56 may be formed by first forming a guide cavity in a dielectric layer 60, and then filling the guide cavity with a suitable filter material.

The optical waveguide 56 may be configured relative to the dielectric material 60 in order to form a light-guiding structure. For example, the optical waveguide 56 may have a refractive index of about 2.0 so that the light emissions are substantially reflected at an interface between the optical waveguide 56 and the surrounding dielectric material 60. In certain examples, the optical waveguide 56 is selected such that the optical density (OD) or absorbance of the excitation light 58 is at least about 4 OD. More specifically, the filter material may be selected and the optical waveguide 56 may be dimensioned to achieve at least 4 OD. In other examples, the optical waveguide 56 may be configured to achieve at least about 5 OD or at least about 6 OD.

In this example, the layer(s) 18, 38 (not shown in FIG. 15) of the patterned substrate 10 may be passivation layers. The layer(s) may or may not be supported by the base support 36, which should be transparent to the excitation and emission light used during analysis. At least a portion of the patterned substrate 10 (and thus one of the passivation layers 18, 38 or the base support 36) is in contact with a first embedded metal layer 62 of the CMOS chip 50 and also with an input region 64 of the optical waveguide 56. The contact between the substrate 10 and the first embedded metal layer 62 may be direct contact or may be indirect contact through a shield layer 66.

The passivation layers 18, 38 of the patterned substrate 10 may provide one level of corrosion protection for the embedded metal layer 62 of the CMOS chip 50 that is closest in proximity to the patterned substrate 10. In this example, the passivation layers may be formed of material(s) that is/are transparent to the light emissions (e.g., visible light) resulting from reactions at the reaction site, and that is/are at least initially resistant to the fluidic environment and moisture that may be introduced into or present in the flow channel 32.

An example of the flow cell 20C is shown in FIG. 15, and thus includes the partially patterned substrate 48 as the cover 30, as described in reference to FIG. 2C. In FIG. 15, a single active region 12 and two bonding regions 14 are depicted, and thus the flow cell 20C includes a single flow channel 12. In this example, the partially patterned substrate 48 includes the inlet and outlet ports 70, 72 that are configured to fluidically engage other ports (not shown) for directing fluid(s) into the flow channel 32 (e.g., from a reagent cartridge or other fluid storage system component) and out of the flow channel 32 (e.g., to a waste removal system).

Each reaction site is a localized region in the patterned substrate 10 where a designated reaction may occur. Each reaction site includes a depression 16 having the polymeric hydrogel 22 and primers 24A, 24B therein.

In an example, the reaction site is at least substantially aligned with the input region 64 of a single optical waveguide 56. As such, light emissions at the reaction site may be directed into the input region 64, through the waveguide 56, and to an associated optical sensor 54. In other examples, one reaction site may be aligned with several input regions 64 of several optical waveguides 56. In still other examples, several reaction sites may be aligned with one input region 64 of one optical waveguide 56.

The embedded metal layer 62 may be any suitable CMOS metal, such as aluminum (Al), aluminum chloride (AlCu), tungsten (W), nickel (Ni), or copper (Cu). The embedded metal layer 62 is a functioning part of the CMOS AVdd line, and through the stacked layers 52, is also electrically connected to the optical sensor 54. Thus, the embedded metal layer 62 participates in the detection/sensing operation.

It is to be understood that the other optical sensors 54 and associated components may be configured in an identical or similar manner. It is also to be understood, however, that the CMOS chip 50 may not be manufactured identically or uniformly throughout. Instead, one or more optical sensor 54 and/or associated components may be manufactured differently or have different relationships with respect to one another.

The stacked layer 52 may include interconnected conductive elements (e.g., conductors, traces, vias, interconnects, etc.) that can conduct electrical current. The circuitry may be configured for selectively transmitting data signals that are based on detected photons. The circuitry may also be configured for signal amplification, digitization, storage, and/or processing. The circuitry may collect and analyze the detected light emissions and generate data signals for communicating detection data to a bioassay system. The circuitry may also perform additional analog and/or digital signal processing in the CMOS chip 50.

The CMOS chip 50 may be manufactured using integrated circuit manufacturing processes. The CMOS chip 50 may include multiple layers, such as a sensor base/layer (e.g., a silicon layer or wafer, or dielectric layer 60). The sensor base may include the optical sensor 54. When the CMOS chip 50 is fully formed, the optical sensor 54 may be electrically coupled to the rest of the circuitry in the stacked layers 52 through gate(s), transistor(s), etc.

As used in reference to FIG. 15, the term "layer" is not limited to a single continuous body of material unless otherwise noted. For example, the sensor base/layer may include multiple sub-layers that are different materials and/or may include coatings, adhesives, and the like. Furthermore, one or more of the layers (or sub-layers) may be modified (e.g., etched, deposited with material, etc.) to provide the features described herein.

The stacked layers 52 also include a plurality of metal-dielectric layers. Each of these layers includes metallic elements (e.g., M1-M5, which may be, for example, W (tungsten), Cu (copper), Al (aluminum), or any other suitable CMOS conductive material) and dielectric material 60 (e.g., $SiO_2$). Various metallic elements M1-M5 and dielectric materials 60 may be used, such as those suitable for integrated circuit manufacturing.

In the example shown in FIG. 15, each of the plurality of metal-dielectric layers L1-L6 includes both metallic elements M1, M2, M3, M4, M5 and dielectric material 60. In each of the layers L1-L6, the metallic elements M1, M2, M3, M4, M5 are interconnected and are embedded within dielectric material 60. In some of the metal-dielectric layers L1-L6, additional metallic elements may also be included. Some of these additional metallic elements may be used to address individual pixels through a row and column selector. The voltages at these elements may vary and switch between about −1.4 V and about 4.4 V depending upon which pixel the device is reading out.

The configuration of the metallic elements M1, M2, M3, M4, M5 and dielectric layer 60 in FIG. 15 is illustrative of the circuitry, and it is to be understood that other examples may include fewer or additional layers and/or may have different configurations of the metallic elements M1-M5.

In the example shown in FIG. 15, the shield layer 66 is in contact with at least a portion of the patterned structure 10. The shield layer 66 has an aperture at least partially adjacent to the input region 64 of the optical waveguide 56. This aperture enables the reaction site (and at least some of the light emissions therefrom) to be optically connected to the waveguide 56. It is to be understood that the shield layer 66 may have an aperture at least partially adjacent to the input region 64 of each optical waveguide 56. The shield layer 66 may extend continuously between adjacent apertures.

The shield layer 66 may include any material that can block, reflect, and/or significantly attenuate the light signals that are propagating through the flow channel 32. The light signals may be the excitation light 58 and/or the light emissions from the reaction site(s). As an example, the shield layer 66 may be tungsten (W).

Methods

The method used to form the flow cell 20A, 20B, 20C, and 20D will depend, at least in part, upon the architecture of the active and bonding regions 12, 12', 14, 14'.

One example of the method includes forming the patterned substrate 10 by: defining the active region 12 within the layer 18 by defining first depressions 16 at first predetermined locations within a predetermined region of the layer 18 that is surrounded by a second predetermined region of the layer 18; and introducing the surface chemistry to each of the first depressions 16; defining a bonding region 14 within the layer by defining second depressions 16' at second predetermined locations within the second predetermined region of the layer 18; introducing the adhesive 28 to the bonding region 14, including in each of the second depressions 16'; and positioning a cover 30 in contact with the adhesive 28, thereby securing the cover 30 to the bonding region 14 and creating a flow channel 32 between a portion of the cover 30 and the active region 12.

When the depressions 16, 16' have the same geometry, they may be formed at the same time using the same process.

To generate the same depressions 16, 16' in a single layer substrate, embossing or etching may be used. When the layer 18 is an etchable single layer substrate, and defining the first and second depressions 16, 16' with the same geometry involves etching through a portion of the etchable single layer substrate at the first predetermined locations and at the second predetermined locations.

To generate the same depressions 16, 16' in layer 18 of a multi-layered substrate, several different techniques may be used. In one example, an inorganic oxide may be selectively applied to the base support 36, e.g., via vapor deposition, aerosol printing, or inkjet printing, in the desired pattern of the interstitial regions 26, 26' and outline of the depressions 16, 16'. In another example, a resin matrix material may be applied to the base support 36 and then patterned to form the depressions 16, 16'. Suitable deposition techniques include chemical vapor deposition, dip coating, dunk coating, spin coating, spray coating, puddle dispensing, ultrasonic spray coating, doctor blade coating, aerosol printing, screen printing, microcontact printing, etc. Suitable patterning techniques include photolithography, nanoimprint lithography (NIL), stamping techniques, embossing techniques, molding techniques, microetching techniques, printing techniques, etc.

To generate the same depressions 16, 16' in multiple layers 18, 38 of a multi-layered substrate, etching techniques may be used. When the different layers have different etch rates, the etchant, time for etching, or other etching conditions may be varied to achieve the desired geometry. In some instances, a photolithography mask or metal sacrificial layer may be used to protect areas from being etched and then subsequently removed in a suitable remover. Dry etching processes, such as an anisotropic oxygen plasma, a $CF_4$ plasma, or a mixture of 90% $CF_4$ and 10% $O_2$ plasma may be used for etching resin layers 18, 38.

When the depressions 16, 16' have the different geometries, they may be formed sequentially using different processes. Because the depressions 16 are cylindrical or oval cylindrical, they may be formed using any of the techniques disclosed herein, including photolithography, nanoimprint lithography (NIL), stamping techniques, embossing techniques, molding techniques, microetching techniques, or printing techniques disclosed herein. The slanted cylindrical depressions 16' shown in FIG. 8 may also be formed using any of these techniques.

The depressions 16' shown in FIG. 4A through FIG. 4D may be formed using different etching techniques to define the narrow portion $P_N$ in the layer 18 and the wide portion $P_W$ in the layer 38. These processes begin with a stack of layers, with the first layer 18 being positioned over the at least one additional layer 38, which is positioned over the base support 36. In these examples, the layer 18 and the at least one additional layer 38 have different etch rates and the base support 36 is non-etchable. The second depressions 16' are formed by sequentially etching through the layer 18 and then through the at least one additional layer 38 at the second predetermined locations. Anisotropic etching may be used to etch through the layer 18, and then isotropic etching may be used to etch through the layer(s) 38. In this example, the first depressions 16 can be formed by etching through the layer 18 or by sequentially etching through the layer 18 and then through the at least one additional layer 38 at the first predetermined locations. For the depressions 16, anisotropic etching may be used through the layers 18, 38.

The depressions 16' shown in FIG. 4E may be formed by the method shown in FIG. 18. In this example, the second predetermined region (where the bonding region 14 is to be formed) of the layer 18 includes etchable particles 80 mixed in the layer 18; and defining the second depressions 16' involves etching the etchable particles 80 from the layer 18. The etchable particles 80 may be any material that has a higher etch rate than the etch rate of the layer 18. As such, the etchable particles 80 can be exposed to an etchant and removed while the layer 18 remains intact.

The depression 16' with the suspended feature 44 shown in FIG. 9A through FIG. 9C may be prepared by first generating the feature 44 using any suitable technique, such as molding, 3D printing, or the like. The features 44 are then positioned on and secured to (e.g., via an adhesive) the layer 18 in a pattern that corresponds with depression formation, and secured to the layer 18. The features 44 could also be formed in the desired positions on the layer 18 using vacuum deposition (e.g., through sputtering, thermal evaporation, etc.), solution based deposition, or spray deposition through a photolithography mask which exposes the desired positions of the features 44. Once the feature material is deposited, the photolithography mask and any material thereon could be removed to leave the features 44 in the desired positions. The layer 18 is then selectively etched to form the depression 16' around and underneath the feature 44. Etching is performed so that after the depression 16' is formed, the interstitial regions 26' of the layer 18 support the features 44, but the features 44 are suspended over the depressions 16'.

Another example for forming the feature 44 is shown in FIG. 17. This example utilizes a negative or positive photoresist as a mask for subsequent etching. The stack of materials may include the base support 36, at least one additional layer 38, and the layer 18.

In this example, a photoresist is deposited and patterned over the layer 18. An example of a suitable negative photoresist includes the NR® series photoresist (available from Futurrex). Other suitable negative photoresists include the SU-8 Series and the KMPR® Series (both of which are available from Kayaku Advanced Materials, Inc.), or the UVN™ Series (available from DuPont). Examples of suitable positive photoresists include the MICROPOSIT® S1800 series or the AZ® 1500 series, both of which are available from Kayaku Advanced Materials, Inc. Another example of a suitable positive photoresist is SPR™-220 (from DuPont).

When a negative photoresist is used, it is applied on the layer 18 using any suitable technique. To develop the negative photoresist, an ultraviolet light dosage is directed at portions of the resist that are to become insoluble. The portions not exposed to light become soluble, and are removable with a developer. The removed portions create the pattern P for creating the second depressions 16'.

When a positive photoresist is used, it is applied on the layer 18 using any suitable technique. To develop the positive photoresist, an ultraviolet light dosage is directed at portions of the resist that are to become soluble, and are removable with a developer. The removed portions create the pattern P for creating the second depressions 16'. The portions not exposed to light become insoluble.

FIG. 16A and FIG. 16B illustrate two examples of the patterned photoresist from the top view. The photoresist includes an insoluble photoresist feature 76 that overlies a portion of each of the second predetermined locations 78 (see FIG. 17, where the second depressions 16' are to be formed), and ii) an insoluble photoresist region 74 over interstitial regions 26' of the second predetermined region that surround each of the second predetermined locations 78. The outline of the pattern P defined in the insoluble photoresist 74, 76 provides the general shape for the second depressions 16'. The insoluble photoresist features 76 positioned between the pattern P define where the features 44 will be formed in the underlying layer 18, 38. The insoluble photoresist feature 76 has a cross-sectional shape, with respect to a surface plane of the underlying layer 18, that is selected from the group consisting of a rectangle (FIG. 16A), a cross (FIG. 16B), an X, and a plurality of intersecting spokes. The insoluble photoresist feature 76 may have any configuration that forms a pattern P of etch regions that are close enough together that their conical etch regions in the layer 38 merge together during etching (see FIG. 17).

In the example method of FIG. 17, the photoresist is patterned over the layer 18 to define i) the insoluble photoresist feature 76 over a portion of each of the second predetermined locations 78 (where the second depressions 16' are to be formed), and ii) the insoluble photoresist region 74 over interstitial regions 26' of the second predetermined region (i.e., the bonding region 14, 14') that surrounds each of the second predetermined locations 78, whereby an area 78' of the layer 18 is exposed at each of the second predetermined locations 78.

In this example method, the second depressions 16' are defined by etching the exposed area 78' of the layer 18 at each of the second predetermined locations 78, thereby exposing an area 38' of the at least one additional layer 38 at each of the second predetermined locations 78 and forming a layer feature 44' underlying each of the insoluble photoresist features 76; and then etching the exposed area 38' of the at least one additional layer 38 at each of the second predetermined locations 78, whereby at least a portion of the second layer 38 underlying each of the layer features 44' is removed. In this example, anisotropic etching may be used to etch the layer 18 at the areas 78' exposed between the phototresist, and then isotropic etching may be used to etch the layer 38 at the areas 38' exposed between the photoresist.

As depicted in FIG. 17, etching of the layer 38 continues partially under the feature 44', and thus enables the etched regions to merge together to extend the depression 16' under the feature 44'. The feature 44' and any remaining portion of the layer 38 that is attached to the feature 44' forms the feature 44 in this example.

While not shown in FIG. 17, the photoresist region and feature 74, 76 may then be removed, in a suitable remover for the photoresist used. A cured positive photoresist may be lifted off with removers such as dimethylsulfoxide (DMSO) with sonication, an acetone wash, a propylene glycol monomethyl ether acetate wash, or an NMP (N-methyl-2-pyrrolidone) based stripper wash. A cured negative photoresist may be lifted off with removers such as dimethylsulfoxide (DMSO) with sonication, an acetone wash, or an NMP (N-methyl-2-pyrrolidone) based stripper wash.

In any of these examples, once the depressions 16, 16' are formed, the surface chemistry is introduced into the depressions 16.

One example of a suitable technique for introducing the surface chemistry may include a selective deposition technique (e.g., controlled printing techniques, etc.). In one example, a pre-grafted polymeric hydrogel 22 (i.e., the hydrogel 22 with the primers 24A, 24B grafted thereto) may be deposited into the depressions 16 and not on the interstitial regions 26, 26' or in the depressions 16'. In another example, the polymeric hydrogel 22 may be selectively deposited into the depressions 16 and not on the interstitial regions 26, 26' or in the depressions 16', and then the primers 24A, 24B are grafted to the polymeric hydrogel 22 in the depression 16. In the latter example, it is to be understood that the layer 18 does not include functional groups for attaching the primers 24A, 24B, and thus the primers 24A, 24B will graft to the polymeric hydrogel 22 in the depressions 16 and not to the interstitial regions 26, 26' or the depressions 16'.

The primers 24A, 24B may be included in a carrier liquid in a concentration ranging from about 0.5 µM to about 100 µM. In one example, the primer concentration ranges from about 5 µM to about 25 µM. The carrier liquid of the primer fluid may be water. A buffer and/or salt may be added to the carrier liquid for grafting the primers 24A, 24B to suitable functional groups of the polymeric hydrogel 22. The buffer has a pH ranging from 5 to 12, and the buffer used will depend upon the functional group at the 5' end of the primers 24A, 24B. A neutral buffer and/or salt may be added to the primer fluid for grafting BCN terminated primers, while an alkaline buffer may be added to the primer fluid for copper-assisted grafting methods (e.g., the click reaction). Any of the primer fluids used in copper-assisted grafting methods may also include a copper catalyst. Example of neutral buffers include Tris(hydroxymethyl) aminomethane (TRIS) buffers, such as TRIS-HCl or TRIS-EDTA, or a carbonate buffer (e.g., 0.25 M to 1 M). Sodium sulfate (e.g., 1 M to 2 M) is a suitable salt that may be used. Examples of alkaline buffers include Tris(hydroxymethyl) aminomethane (CHES), 3-(Cyclohexylamino)-1-propanesulphonic acid (CAPS), and alkaline buffer solution (from Sigma-Aldrich).

For grafting, the primer fluid is introduced into the active region 12. Grafting may be performed at a temperature ranging from about 55° C. to about 65° C. for a time ranging from about 20 minutes to about 60 minutes. In one example, grafting is performed at 60° C. for about 30 minutes or 60 minutes. It is to be understood that a lower temperature and a longer time or a higher temperature and a shorter time may also be used. Some primer grafting techniques, such as those involving BCN grafting to tetrazine units, may be performed at room temperature (e.g., 18° C. to about 25° C.). During grafting, the primers 24A, 24B attach to at least some of the azide or tetrazine groups or other functional groups of the polymeric hydrogel 22 and have no affinity for the interstitial regions 26, 26' or the depressions 16' which have no polymeric hydrogel 22 therein.

Another example of a suitable technique for introducing the surface chemistry may include the use of a photoresist. In this example, the photoresist is developed to mask the bonding region 14 while the surface chemistry (e.g., the polymeric hydrogel 22 and the primers 24A, 24B) is added to the active region 12.

After the photoresist is in place over the bonding region 14, a mixture of the polymeric hydrogel 22 may be generated and applied to the active region 12, both in the depressions 16 and on the interstitial regions 26. In one example, any example of the polymeric hydrogel 22 disclosed herein may be present in a mixture (e.g., with water or with ethanol and water). The mixture may then be applied to the layer 18 in the active region 12 using spin coating, or dipping or dip coating, or flow of the material under positive or negative pressure, or another suitable technique. These types of techniques blanketly deposit the polymeric hydrogel 22 on the layer 18 at the active region 12. In some examples, the surface of the single layer 18 may be activated, and then the mixture (including the polymeric hydrogel 22) may be applied thereto. In one example, a silane or silane derivative (e.g., norbornene silane) may be deposited on the surface of the layer 18 using vapor deposition, spin coating, or other deposition methods. In another example, the layer 18 may be exposed to plasma ashing to generate surface-activating agent(s) (e.g., —OH groups) that can adhere to the polymeric hydrogel 22.

Depending upon the chemistry of the polymeric hydrogel 22, the applied mixture may be exposed to a curing process. In an example, curing may take place at a temperature ranging from room temperature (e.g., about 25° C.) to about 95° C. for a time ranging from about 1 millisecond to about several days.

When a blanket deposition technique is used, polishing may then be performed in order to remove the polymeric hydrogel 22 from the interstitial regions 26, while leaving the polymeric hydrogel 22 in the depressions 16 at least substantially intact. The primers 24A, 24B may then be grafted to the polymeric hydrogel 22 in the depressions 16 as described herein. The photoresist is then removed from the bonding region 14 using a suitable remover.

Once the surface chemistry is in place in the active region 12, the adhesive 28 may then be selectively applied to the bonding region 14, and the cover 30 may be placed into contact with the adhesive 28.

The adhesive 28 may be applied using a dispense coater so that it is not deposited into the active region 12. An example of the dispense coater that may be used in this example method is a GPD coater with a progressive cavity pump, which is a highly accurate volumetric dispense pump. Another type of dispense coater is a pressure driven dispense system. In another example, the adhesive 28 may be applied using an inkjet or other similar printer.

The temperature and pressure used during bonding may be selected to be higher than the conditions used during flow cell 20A, 20C, 20D operation so that the bond does not weaken during use. The adhesive 28 is allowed to cure, which secures the cover 30 to the patterned substrate 10 to form the flow cell 20A, 20C, 20D. In one example, the bonding temperature may be up to 80° C., and the bonding pressure may be up to 20 kN.

Another example of the method includes forming a patterned substrate 10' by: defining an active region 12' within a layer 18 by defining first posts 34 at first predetermined locations within a predetermined region of the layer 18 that is surrounded by a second predetermined region of the layer; and introducing the surface chemistry to each of the first posts 34; defining a bonding region 14' of the layer by defining second posts 34' at second predetermined locations within the second predetermined region of the layer 18; introducing the adhesive 28 to the bonding region 14 at least around each of the second posts 34'; and positioning a cover 30 in contact with the adhesive 28, thereby securing the cover 30 to the bonding region 14' and creating a flow channel 32 between a portion of the cover 30 and the active region 12'.

When the posts 34, 34' have the same geometry, they may be formed at the same time using the same process.

To generate the same posts 34, 34' in a single layer substrate, embossing or etching may be used. When the layer 18 is an etchable single layer substrate, and defining the first and second posts 34, 34' with the same geometry involves etching through a portion of the etchable single layer substrate around the first predetermined locations and at the second predetermined locations.

To generate the same posts 34, 34' in the layer 18 of a multi-layered substrate, several different techniques may be used. In one example, an inorganic oxide may be selectively applied to the base support 36, e.g., via vapor deposition, aerosol printing, or inkjet printing, in the desired pattern of posts 34, 34'. In another example, a resin matrix material may be applied to the base support 36 and then patterned to form the posts 34, 34'. Any suitable deposition technique and patterning technique may be used.

When the posts 34, 34' have the different geometries, they may be formed sequentially using different processes. Because the posts 34 are cylindrical or oval cylindrical, they may be formed using any of the techniques disclosed herein, including photolithography, nanoimprint lithography (NIL), stamping techniques, embossing techniques, molding techniques, microetching techniques, or printing techniques disclosed herein. The slanted cylindrical posts 34' shown in FIG. 13 may also be formed using any of these techniques.

The posts 34, 34' shown in FIG. 11 and FIG. 12 may be formed using different etching techniques to define the narrow portion $P_N$ in the layer 38 and the wide portion $P_W$ in the layer 18. These processes begin with a stack of layers, with the first layer 18 being positioned over the at least one additional layer 38, which is positioned over the base support 36. In these examples, the layer 18 and the at least one additional layer 38 have different etch rates and the base support 36 is non-etchable. The second posts 34' are formed by sequentially etching through the layer 18 and then through the at least one additional layer 38 to leave the posts 34' at the second predetermined locations. In this example, the first posts 34 can be formed by etching through the layer 18 or by sequentially etching through the layer 18 and then through the at least one additional layer 38 to leave the posts 34 at the first predetermined locations.

Once the posts 34, 34' are formed, the surface chemistry is introduced onto the posts 34.

One example of a suitable technique for introducing the surface chemistry may include a selective deposition technique (e.g., controlled printing techniques, etc.). In one example, a pre-grafted polymeric hydrogel 22 (i.e., the hydrogel 22 with the primers 24A, 24B grafted thereto) may be deposited onto the posts 34 and not on the interstitial regions 26, 26' or on the posts 34'. In another example, the polymeric hydrogel 22 may be selectively deposited onto the posts 34 and not on the interstitial regions 26, 26' or on the posts 34', and then the primers 24A, 24B are grafted to the polymeric hydrogel 22 on the posts 34. In the latter example, it is to be understood that the layer 18 does not include functional groups for attaching the primers 24A, 24B, and thus the primers 24A, 24B will graft to the polymeric hydrogel 22 on the posts 34 and not to the interstitial regions 26, 26' or the posts 34'. The primers 24A, 24B may be grafted as described herein.

Another example of a suitable technique for introducing the surface chemistry may include the use of a photoresist. In this example, the photoresist is developed to mask the bonding region 14' and the interstitial regions 26 surrounding the posts 34 in the active region 12' while the surface chemistry (e.g., the polymeric hydrogel 22 and the primers 24A, 24B) is added to the posts 34 active region 12'.

After the photoresist is in place over the bonding region 14' and the interstitial regions 26, a mixture of the polymeric hydrogel 22 may be generated and applied to the posts 34 in the active region 12'. In one example, any example of the polymeric hydrogel 22 disclosed herein may be present in a mixture (e.g., with water or with ethanol and water). The mixture may then be applied to the exposed posts 34 in the active region 12' using spin coating, or dipping or dip coating, or flow of the material under positive or negative pressure, or another suitable technique. These types of techniques blanketly deposit the polymeric hydrogel 22. Depending upon the chemistry of the polymeric hydrogel 22, the applied mixture may be exposed to a curing process as described herein.

The photoresist is then removed from the bonding region 14' and the interstitial region 26 using a suitable remover. This process will also remove the polymeric hydrogel 22 that overlies the photoresist. This re-exposes the posts 34' and the interstitial regions 26, 26'.

The primers 24A, 24B may then be grafted to the polymeric hydrogel 22 on the posts 34 as described herein. It is to be understood that the posts 34' and the interstitial regions 26, 26' do not include functional groups for attaching the primers 24A, 24B, and thus the primers 24A, 24B will graft to the polymeric hydrogel 22 on the posts 34 and not to the interstitial regions 26, 26' or the posts 34'.

Once the surface chemistry is in place in the active region 12', the adhesive 28 may then be selectively applied to the bonding region 14', and the cover 30 may be placed into contact with the adhesive 28. The bonding process may be performed as described herein to form the flow cell 20B.

To further illustrate the present disclosure, an example is given herein. It is to be understood that this example is provided for illustrative purposes and is not to be construed as limiting the scope of the present disclosure.

Non-Limiting Working Example

Three different types of flow cells were used in this example.

The first type of flow cells included two active regions patterned with cylindrical depressions and surrounded by the bonding regions. The example flow cells of the first type included depressions in the bonding region, having small cylindrical shapes, or larger cylindrical shapes, or oval cylindrical shapes. The comparative flow cells of the first type did not include depressions in the bonding region. 103 example flow cells of the first type were prepared and tested, and 34 of the comparative flow cells of the first type were prepared and tested.

The second type of flow cells were similar to the first type but had wider active areas and narrower bonding regions. The example flow cells of the second type included depressions in the bonding region, having small cylindrical shapes, or larger cylindrical shapes, or oval cylindrical shapes. The comparative flow cells of the second type did not include depressions in the bonding region. 17 example flow cells of the second type were prepared and tested, and 13 of the comparative flow cells of the second type were prepared and tested.

The third type of flow cells included eight active regions patterned with cylindrical depressions and surrounded by the bonding regions patterned with larger cylindrical depressions. The comparative flow cells of the third type did not include depressions in the bonding region. 13 example flow cells of the third type were prepared and tested, and 16 of the comparative flow cells of the third type were prepared and tested.

The example and comparative flow cells of the first, second, and third types were subjected to a cyclical pressure test. Each flow cell was filled with air and held for 30 seconds to measure air leaks. Once a leak was detected, the flow cell was considered to burst.

The average results for the example and comparative example flow cells of the first type are shown in FIG. 19A. The average results for the example and comparative example flow cells of the second type are shown in FIG. 19B. The average results for the example and comparative example flow cells of the third type are shown in FIG. 19C. In each of FIG. 19A, FIG. 19B, and FIG. 19C, the example flow cells are labeled "patterned" and the comparative flow cells are labeled "unpatterned". The results for each type of flow cell demonstrate that the flow cells with the patterned bonding region lasted longer than the flow cells without the patterned bonding region.

Additional Notes

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A flow cell, comprising:
a patterned substrate having an active region and a bonding region that at least partially surrounds the active region, wherein the active region includes:
first depressions defined in a layer of the patterned substrate;
surface chemistry positioned in the first depressions; and
first interstitial regions surrounding the first depressions;
and wherein the bonding region includes:
second depressions defined in the layer; and
second interstitial regions surrounding the second depressions;
an adhesive positioned in the second depressions and over the second interstitial regions; and
a cover attached to the adhesive such that a flow channel is defined between a portion of the cover and the active region.

2. The flow cell as defined in claim 1, wherein a geometry of each of the first depressions and of each of the second depressions is the same, and wherein the geometry is selected from the group consisting of a cylinder, an oval cylinder, a sphere, a cube, a cuboid, a cone, a lanceoloid, a polygonal prism, and combinations thereof.

3. The flow cell as defined in claim 1, wherein a geometry of each of the first depressions is different from a geometry of each of the second depressions.

4. The flow cell as defined in claim 3, wherein:
the geometry of each of the first depressions is selected from the group consisting of a cylinder, an oval cylinder, a cube, a cuboid, a polygonal prism, and combinations thereof;
the geometry of each of the second depressions includes a narrow portion that opens to a wide portion; and
for the geometry of each of the second depressions, a dimension across an opening of the narrow portion is smaller than at least one dimension of the wide portion that is parallel to the dimension across the opening.

5. The flow cell as defined in claim 4, wherein:
the narrow portion has a geometry selected from the group consisting of a cylinder, an oval cylinder, a cube, and a cuboid; and
the wide portion has a geometry selected from the group consisting of a cylinder, an oval cylinder, a cube, a cuboid, a lanceoloid, a sphere, a polygonal prism, and a cone.

6. The flow cell as defined in claim 4, wherein:
the patterned substrate includes at least one additional layer underlying the layer, and a base support underlying the at least one additional layer; and
for the geometry of each of the second depressions:
the narrow portion is defined in and through the layer;
the wide portion is defined in and through the at least one additional layer;
the base support defines a bottom of the wide portion; and
the layer defines an overhang above a portion of the wide portion.

7. The flow cell as defined in claim 3, wherein:
the geometry of each of the first depressions is selected from the group consisting of a cylinder, an oval cylinder, a sphere, a cube, a cuboid, a cone, a lanceoloid, a polygonal prism, and combinations thereof;
the geometry of each of the second depressions is selected from the group consisting of a slanted cylinder, a slanted oval cylinder, a slanted cube, a slanted cuboid, and a slanted polygonal prism; and
the geometry of each of the second depressions has its central axis at a non-ninety degree angle relative to a plane at a bottom of the second depression.

8. The flow cell as defined in claim 1, further comprising a plurality of features, each feature extending over a portion of a respective one of the second depressions and supported by the second interstitial regions surrounding the respective one of the second depressions, wherein the adhesive wraps around each feature.

9. The flow cell as defined in claim 8, wherein each feature extends partially into a depth of the respective one of the second depressions.

10. The flow cell as defined in claim 1, wherein:
the patterned substrate includes a plurality of additional layers underlying the layer, and a base support underlying the plurality of additional layers;
an etch rate of the layer and of each of the plurality of additional layers increases moving toward the base support;
the base support is non-etchable; and
the geometry of each of the second depressions increases moving toward the base support.

11. The flow cell as defined in claim 1, wherein:
the patterned substrate includes a plurality of additional layers underlying the layer, and a base support underlying the plurality of additional layers;
the layer has a first etch rate;
an etch rate of each of the plurality of additional layers alternates between a second etch rate and the first etch rate moving toward the base support;
the base support is non-etchable; and
the geometry of each of the second depressions varies between a first dimension and a second dimension moving toward the base support.

12. A method, comprising:
forming a patterned substrate by:
defining an active region within a layer by:
defining first depressions at first predetermined locations within a first predetermined region of the layer that is surrounded by a second predetermined region of the layer; and
introducing surface chemistry to each of the first depressions;
defining a patterned bonding region within the layer by defining second depressions at second predetermined locations within the second predetermined region of the layer;
introducing an adhesive to the patterned bonding region, including in each of the second depressions; and
positioning a cover in contact with the adhesive, thereby securing the cover to the patterned bonding region and creating a flow channel between a portion of the cover and the active region.

13. The method as defined in claim 12, wherein:
the patterned substrate is a multi-layer substrate, including the layer positioned over at least one additional layer over a base support;
each of the first depressions is defined through the layer and the at least one additional layer, wherein portions of the layer define first interstitial regions that separate the first depressions from one another; and
each of the second depressions is defined through the layer and the at least one additional layer, wherein portions of the layer define second interstitial regions that separate the second depressions from one another.

14. The method as defined in claim 13, wherein:
the layer and the at least one additional layer have different etch rates;
the base support is non-etchable;
defining the first depressions involves sequentially etching through the layer and then through the at least one additional layer at the first predetermined locations; and
defining the second depressions involves sequentially etching through the layer and then through the at least one additional layer at the second predetermined locations.

15. The method as defined in claim 14, wherein:
a geometry of each of the first depressions extends through the layer and the at least one additional layer and is selected from the group consisting of a cylinder, an oval cylinder, a sphere, a cube, a cuboid, a cone, a lanceoloid, a polygonal prism, and combinations thereof;
a geometry of each of the second depressions includes a narrow portion that extends through the layer and that opens to a wide portion that extends through the at least one additional layer; and
for the geometry of each of the second depressions, a dimension across an opening of the narrow portion is smaller than at least one dimension of the wide portion that is parallel to the dimension across the opening.

16. The method as defined in claim 15, wherein:
the narrow portion has a geometry selected from the group consisting of a cylinder, an oval cylinder, a cube, a cuboid, and a polygonal prism; and
the wide portion has a geometry selected from the group consisting of a cylinder, an oval cylinder, a cube, a cuboid, a lanceoloid, a sphere, a cone, a polygonal prism, and combinations thereof.

17. The method as defined in claim 15, wherein each of the second depressions is slanted such that its central axis is at a non-ninety degree angle relative to a plane at a bottom of the second depression.

18. The method as defined in claim 13, wherein:
the geometry of each of the first depressions extends through the layer and the at least one additional layer and is selected from the group consisting of a cylinder, an oval cylinder, a sphere, a cube, a cuboid, a cone, a lanceoloid, a polygonal prism, and combinations thereof;
the geometry of each of the second depressions is selected from the group consisting of a slanted cylinder, a slanted oval cylinder, a slanted cube, a slanted cuboid, and a slanted polygonal prism, that extends through the layer and the at least one additional layer; and
the geometry of each of the second depressions has its central axis at a non-ninety degree angle relative to a plane at a bottom of the second depression.

19. The method as defined in claim 12, wherein:
the patterned substrate is a multi-layer substrate, including the layer positioned over a plurality of additional layers over a base support;
an etch rate of the layer and of each of the plurality of additional layers increases moving toward the base support;
the base support is non-etchable;
defining the second depressions involves sequentially etching through the layer and then through each of the plurality of additional layers; and
the geometry of each of the second depressions increases moving toward the base support.

20. The method as defined in claim 12, wherein:
the patterned substrate is a multi-layer substrate, including the layer positioned over a plurality of additional layers over a base support;
the layer has a first etch rate;
an etch rate of each of the plurality of additional layers alternates between a second etch rate and the first etch rate moving toward the base support;
the base support is non-etchable;
defining the second depressions involves sequentially etching through the layer and then through each of the plurality of additional layers; and
the geometry of each of the second depressions varies between a first dimension and a second dimension moving toward the base support.

21. The method as defined in claim 12, wherein:
the layer is an etchable material positioned over a non-etchable base support;
defining the first depressions involves etching through the etchable material at the first predetermined locations;
a non-etchable material is positioned over the etchable material at a portion of each of the second predetermined locations; and
defining each of the second depressions involves etching through a portion of the etchable material around and under the non-etchable material at the second predetermined locations, whereby the non-etchable material forms respective features that extend over a portion of each of the second depressions.

22. The method as defined in claim 12, wherein:
the patterned substrate is a multi-layer substrate, including the layer positioned over a second layer over a base support;
the layer has a first etch rate and the second layer has a second etch rate that is higher than the first etch rate; and
defining the first depressions involves etching through the layer and the second layer at the first predetermined locations.

23. The method as defined in claim 22, further comprising:
patterning a photoresist over the layer to define i) an insoluble photoresist feature over a portion of each of the second predetermined locations, wherein each insoluble photoresist feature has a cross-sectional shape, with respect to a surface plane of the layer, selected from the group consisting of a rectangle, a cross, an X, and a plurality of intersecting spokes, and ii) an insoluble photoresist region over interstitial regions of the second predetermined region that surround each of the second predetermined locations, whereby an area of the layer is exposed at each of the second predetermined locations; and
defining the second depressions involves:
etching the exposed area of the layer at each of the second predetermined locations, thereby exposing an area of the second layer at each of the second predetermined locations and forming a layer feature underlying each of the insoluble photoresist features; and then
etching the exposed area of the second layer at each of the second predetermined locations, whereby at least a portion of the second layer underlying each of the layer features is removed.

24. The method as defined in claim 12, wherein a geometry of each of the first depressions and of each of the second depressions is the same.

25. The method as defined in claim 12, wherein:
the second predetermined region of the layer includes etchable particles mixed therein; and
defining the second depressions involves etching the etchable particles from the layer.

* * * * *

```
                          SEQUENCE LISTING

Sequence total quantity: 13
SEQ ID NO: 1            moltype = DNA  length = 29
FEATURE                 Location/Qualifiers
source                  1..29
                        mol_type = other DNA
                        organism = synthetic construct
modified_base           23
                        mod_base = OTHER
                        note = URACIL
SEQUENCE: 1
aatgatacgg cgaccaccga gatctacac                                        29

SEQ ID NO: 2            moltype = DNA  length = 24
FEATURE                 Location/Qualifiers
source                  1..24
                        mol_type = other DNA
                        organism = synthetic construct
modified_base           22
                        mod_base = OTHER
                        note = 8-oxoguanine
SEQUENCE: 2
caagcagaag acggcatacg anat                                             24

SEQ ID NO: 3            moltype = DNA  length = 24
FEATURE                 Location/Qualifiers
source                  1..24
                        mol_type = other DNA
                        organism = synthetic construct
modified_base           20
                        mod_base = OTHER
                        note = 8-oxoguanine
SEQUENCE: 3
caagcagaag acggcatacn agat                                             24

SEQ ID NO: 4            moltype = DNA  length = 24
FEATURE                 Location/Qualifiers
source                  1..24
                        mol_type = other DNA
                        organism = synthetic construct
modified_base           20
                        mod_base = OTHER
                        note = 8-oxoguanine
modified_base           22
                        mod_base = OTHER
                        note = 8-oxoguanine
SEQUENCE: 4
caagcagaag acggcatacn anat                                             24

SEQ ID NO: 5            moltype = DNA  length = 29
FEATURE                 Location/Qualifiers
source                  1..29
                        mol_type = other DNA
                        organism = synthetic construct
modified_base           23
                        mod_base = OTHER
                        note = allyl-T
SEQUENCE: 5
aatgatacgg cgaccaccga ganctacac                                        29

SEQ ID NO: 6            moltype = DNA  length = 35
FEATURE                 Location/Qualifiers
source                  1..35
```

```
                         mol_type = other DNA
                         organism = synthetic construct
SEQUENCE: 6
gctggcacgt ccgaacgctt cgttaatccg ttgag                      35

SEQ ID NO: 7             moltype = DNA  length = 35
FEATURE                  Location/Qualifiers
source                   1..35
                         mol_type = other DNA
                         organism = synthetic construct
SEQUENCE: 7
ctcaacggat taacgaagcg ttcggacgtg ccagc                      35

SEQ ID NO: 8             moltype = DNA  length = 35
FEATURE                  Location/Qualifiers
source                   1..35
                         mol_type = other DNA
                         organism = synthetic construct
SEQUENCE: 8
cgtcgtctgc catggcgctt cggtggatat gaact                      35

SEQ ID NO: 9             moltype = DNA  length = 35
FEATURE                  Location/Qualifiers
source                   1..35
                         mol_type = other DNA
                         organism = synthetic construct
SEQUENCE: 9
agttcatatc caccgaagcg ccatggcaga cgacg                      35

SEQ ID NO: 10            moltype = DNA  length = 35
FEATURE                  Location/Qualifiers
source                   1..35
                         mol_type = other DNA
                         organism = synthetic construct
SEQUENCE: 10
acggccgcta atatcaacgc gtcgaatccg caact                      35

SEQ ID NO: 11            moltype = DNA  length = 35
FEATURE                  Location/Qualifiers
source                   1..35
                         mol_type = other DNA
                         organism = synthetic construct
SEQUENCE: 11
agttgcggat tcgacgcgtt gatattagcg gccgt                      35

SEQ ID NO: 12            moltype = DNA  length = 34
FEATURE                  Location/Qualifiers
source                   1..34
                         mol_type = other DNA
                         organism = synthetic construct
SEQUENCE: 12
gccgcgttac gttagccgga ctattcgatg cagc                       34

SEQ ID NO: 13            moltype = DNA  length = 34
FEATURE                  Location/Qualifiers
source                   1..34
                         mol_type = other DNA
                         organism = synthetic construct
SEQUENCE: 13
gctgcatcga atagtccggc taacgtaacg cggc                       34
```